(12) United States Patent
Futagawa

(10) Patent No.: US 11,828,721 B2
(45) Date of Patent: Nov. 28, 2023

(54) ION CONCENTRATION MEASURING DEVICE

(71) Applicant: NATIONAL UNIVERSITY CORPORATION SHIZUOKA UNIVERSITY, Shizuoka (JP)

(72) Inventor: Masato Futagawa, Hamamatsu (JP)

(73) Assignee: National University Corporation Shizuoka University

( * ) Notice: Subject to any disclaimer, the term of this patent is extended or adjusted under 35 U.S.C. 154(b) by 558 days.

(21) Appl. No.: 17/058,886

(22) PCT Filed: May 30, 2019

(86) PCT No.: PCT/JP2019/021623
§ 371 (c)(1),
(2) Date: Nov. 25, 2020

(87) PCT Pub. No.: WO2019/230917
PCT Pub. Date: Dec. 5, 2019

(65) Prior Publication Data
US 2021/0199618 A1    Jul. 1, 2021

(30) Foreign Application Priority Data
May 31, 2018  (JP) ................. 2018-104495

(51) Int. Cl.
*G01N 27/414*    (2006.01)
*G01N 27/49*    (2006.01)

(52) U.S. Cl.
CPC .......... *G01N 27/414* (2013.01); *G01N 27/49* (2013.01)

(58) Field of Classification Search
CPC ............... G01N 27/414; G01N 27/49
See application file for complete search history.

(56) References Cited

U.S. PATENT DOCUMENTS

| 4,322,680 A | 3/1982 | Janata et al. ............ 324/71 |
| 8,858,782 B2 * | 10/2014 | Fife ............ G01N 27/4145 |
| | | 257/253 |

(Continued)

FOREIGN PATENT DOCUMENTS

| JP | S57-161541 A | 10/1982 |
| JP | 2011-215105 A | 10/2011 |

(Continued)

OTHER PUBLICATIONS

Extended European Search Report dated Feb. 4, 2022 in counterpart European Application No. 19812633.6.

(Continued)

*Primary Examiner* — Karen Kusumakar
(74) *Attorney, Agent, or Firm* — Ostrolenk Faber LLP

(57) ABSTRACT

A pH sensor obtains the concentration of measurement ions by being provided in a measurement target containing the measurement ions and non-measurement ions. The pH sensor includes: a measurement target power supply that controls a measurement target voltage of the measurement target; a measurement ISFET that includes a measurement ion sensitive membrane selectively trapping the measurement ions to generate a pH-dependent voltage corresponding to the number of trapped measurement ions; a measurement membrane power supply that controls a membrane control voltage of the measurement ion sensitive membrane; and a power supply control unit that controls the size of a voltage to be output from each of the measurement target power supply and the measurement membrane power supply.

21 Claims, 19 Drawing Sheets

(56) References Cited

U.S. PATENT DOCUMENTS

| | | | |
|---|---|---|---|
| 2008/0061323 A1 | 3/2008 | Yazawa et al. | 257/253 |
| 2010/0273672 A1 | 10/2010 | Demoustier-Champagne et al. | 506/9 |
| 2012/0265474 A1* | 10/2012 | Rearick | G16B 30/00 702/104 |
| 2015/0091581 A1 | 4/2015 | Sohbati et al. | 324/464 |

FOREIGN PATENT DOCUMENTS

| | | |
|---|---|---|
| JP | 2011-220954 A | 11/2011 |
| JP | 2011-220955 A | 11/2011 |

OTHER PUBLICATIONS

English translation of the International Preliminary Report on Patentability (Chapter II of the PCT) dated Dec. 3, 2020 with Notification from the International Bureau (Form PCT/IB/338) in corresponding PCT International Application No. PCT/JP2019/021623 in English.

International Search Report dated Sep. 3, 2019 in corresponding PCT International Application No. PCT/JP2019/021623.

Tadayuki Matsuo and Masayoshi Esashi, Methods of ISFET Fabrication, *Sensors and Actuators*, 1 (1981), pp. 77-96.

Shahriar Jamasb, Scott Collins, Rosemary L. Smith, "A Physical model for drift in pH ISFETs", *Sensors and Actuators*, B 49 (1998), pp. 146-155.

* cited by examiner

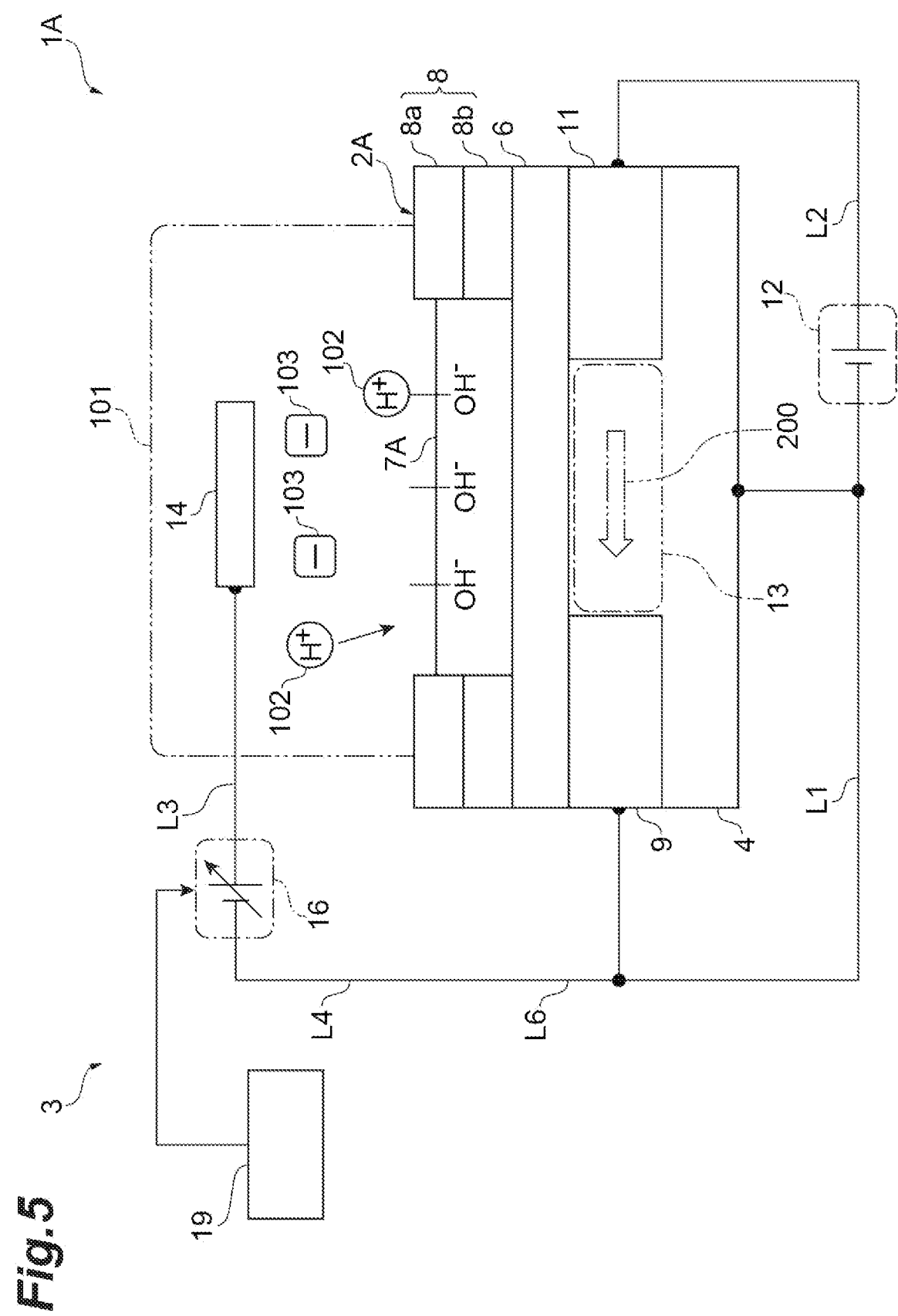

ION CONCENTRATION MEASURING DEVICE

CROSS-REFERENCE TO RELATED APPLICATIONS

The present application is a 35 U.S.C. §§ 371 national phase conversion of International Application No. PCT/JP2019/021623, filed May 30, 2019, which claims priority to Japanese Patent Application No. 2018-104495, filed May 31, 2018, the contents of both of which are incorporated herein by reference. The PCT International Application was published in the Japanese language.

TECHNICAL FIELD

The present invention relates to an ion concentration measuring device.

BACKGROUND ART

A hydrogen-ion exponent (hereinafter, referred to as "pH") is an important physical amount in the agricultural field and the water examination field. As a means for measuring pH, a means using litmus paper, a means using a glass electrode, and a means using an ion sensitive field effect transistor (ISFET) have been known. For example, Non Patent Literature 1 discloses a technology relevant to ISFET.

CITATION LIST

Non Patent Literature

Non Patent Literature 1: TADAYUKI MATSUO, MASAYOSHI ESASHI, "METHODS OF ISFET FABRICATION", Sensors and Actuators, Netherlands, Elsevier Sequoia S. A., 1981, pp. 77-96.

Non Patent Literature 2: Shahriar Jamasb, Scott Collins, Rosemary L. Smith, "A Physical model for drift in pH ISFETs", Sensors and Actuators, 1998, pp. 146-155.

SUMMARY OF INVENTION

Technical Problem

For example, in the agricultural field, it is known that there is a soil pH value suitable for each crop. Therefore, a technology for continuously measuring pH of a target in which fine particles such as the soil are mixed over a long period of time has been required. The measuring means using the litmus paper is unsuitable for continuous measurement. The means using the glass electrode includes the glass electrode and a comparative electrode. The comparative electrode includes a liquid dropping portion in order to ensure electrical connection between a liquid to be measured and an electrode. Such a liquid dropping portion is easily clogged. Non Patent Literature 2 discloses that the output of ISFET includes a temporal property fluctuation (a drift). Accordingly, in any means, it is difficult to continuously and stably obtain a signal according to an ion concentration over a long period of time.

The present invention provides an ion concentration measuring device in which an ion concentration can be continuously and stably obtained over a long period of time.

Solution to Problem

An ion concentration measuring device of one aspect of the present invention obtains a concentration of measurement ions by being provided in a measurement target containing the measurement ions and non-measurement ions. The ion concentration measuring device includes: a measurement target power supply that controls a voltage of the measurement target; a measurement sensor unit that includes a measurement ion sensitive membrane selectively trapping the measurement ions to generate a voltage corresponding to the number of trapped measurement ions; a measurement membrane power supply that controls a voltage of the measurement ion sensitive membrane; and a power supply control unit that controls a size of a voltage to be output from each of the measurement target power supply and the measurement membrane power supply.

In the ion concentration measuring device, a measurement target voltage of the measurement target is based on the voltage that is applied from the measurement target power supply. The voltage of the measurement ion sensitive membrane is based on the voltage that corresponds to the trapped measurement ions and a measurement membrane voltage that is applied from the measurement membrane power supply. The power supply control unit controls a relationship between the voltage that is output from the measurement target power supply and the voltage that is output from the measurement membrane power supply. For example, the power supply control unit controls the measurement target power supply and the measurement membrane power supply, and thus, the polarity of the measurement membrane voltage with respect to the measurement target voltage can be identical to the polarity of the non-measurement ions. In addition, according to the control of the power supply control unit, a difference between the measurement target voltage and the measurement membrane voltage can also be decreased. According to such a relationship between the measurement target voltage and the measurement membrane voltage, the non-measurement ions are not attracted to the measurement ion sensitive membrane. As a result thereof, a drift in the output of a measurement ion selective sensitive membrane, which occurs due to the action of the non-measurement ions on the measurement ion sensitive membrane, can be suppressed. Accordingly, the ion concentration measuring device is capable of continuously and stably obtaining a signal according to an ion concentration over a long period of time.

In one aspect, the ion concentration measuring device may further include: a measurement membrane electrode that is connected to the measurement membrane power supply and is embedded in the measurement ion sensitive membrane. An electrical field is generated inside the measurement ion sensitive membrane. According to such a configuration, the gradient of the electrical field can be increased. In a case where the gradient of the electrical field increases, the non-measurement ions are less likely to get closer to the measurement ion sensitive membrane. As a result thereof, a drift included in the output of the ion sensitive field effect transistor due to the non-measurement ions can be further suppressed.

In one aspect, the measurement membrane electrode may include a plurality of electrode ridges. According to such a configuration, the infiltration of the non-measurement ions to the measurement ion sensitive membrane can be suppressed. Further, according to such a configuration, the ion concentration can be measured.

In one aspect, the sensor unit may be an ion sensitive field effect transistor including a substrate, an insulating membrane provided on the substrate, and the measurement ion sensitive membrane provided on the insulating membrane.

According to such a configuration, a change in the ion concentration can be preferably captured.

In one aspect, the electrode ridges may extend to a direction intersecting with a direction of a current flowing between a source and a drain that are formed in the substrate, and may be separated from each other along the direction of the current. According to such a configuration, a potential difference that is generated by the measurement ion sensitive membrane can be preferably captured.

In one aspect, the sensor unit may be an ion sensitive field effect transistor including a substrate, an insulating membrane provided on the substrate, and the measurement ion sensitive membrane provided on the insulating membrane, and the device may further include a substrate power supply that controls a voltage of the substrate. In addition, the power supply control unit may control the substrate power supply. According to such a configuration, the relationship between the measurement target voltage and the measurement membrane voltage can be set to a relationship in which the infiltration of the non-measurement ions to the measurement ion sensitive membrane can be suppressed. Further, a threshold value of the ion sensitive field effect transistor can be controlled.

In one aspect, when polarity of the non-measurement ions is negative, the power supply control unit may control at least one of the measurement target power supply and the measurement membrane power supply such that the voltage of the measurement ion sensitive membrane is smaller than the voltage of the measurement target. According to such a configuration, a drift included in the output of the ion sensitive field effect transistor due to the non-measurement ions of which the polarity is negative can be suppressed.

In one aspect, when polarity of the non-measurement ions is positive, the power supply control unit may control at least one of the measurement target power supply and the measurement membrane power supply such that the voltage of the measurement ion sensitive membrane is larger than the voltage of the measurement target. According to such a configuration, a drift included in the output of the ion sensitive field effect transistor due to the non-measurement ions of which the polarity is positive can be suppressed.

In one aspect, the power supply control unit may repeatedly perform a suppressing operation for suppressing infiltration of the non-measurement ions to the measurement ion sensitive membrane by controlling at least one of the measurement target power supply and the measurement membrane power supply such that a difference between the voltage of the measurement target and the voltage of the measurement ion sensitive membrane decreases, and a measuring operation for obtaining a voltage corresponding to the number of measurement ions trapped by the measurement sensor unit by controlling at least one of the measurement target power supply and the measurement membrane power supply such that the voltage of the measurement target and the voltage of the measurement ion sensitive membrane have potentials different from each other. According to such a configuration, a drift included in the output of the ion sensitive field effect transistor due to the non-measurement ions of which the polarity is positive or negative can be suppressed.

The ion concentration measuring device in one aspect may further include: a correction sensor unit that includes a correction ion sensitive membrane selectively trapping the measurement ions to generate a voltage corresponding to the number of trapped measurement ions; and a correction membrane power supply that controls a voltage of the correction ion sensitive membrane, the power supply control unit may repeatedly perform a first suppressing operation for suppressing infiltration of the non-measurement ions to the measurement ion sensitive membrane by controlling at least one of the measurement target power supply and the measurement membrane power supply such that a difference between the voltage of the measurement target and the voltage of the measurement ion sensitive membrane decreases, and a first measuring operation for obtaining a voltage corresponding to the number of measurement ions trapped by the measurement sensor unit by controlling at least one of the measurement target power supply and the measurement membrane power supply such that the voltage of the measurement target and the voltage of the measurement ion sensitive membrane have potentials different from each other, and may repeatedly perform a second suppressing operation for suppressing infiltration of the non-measurement ions to the correction ion sensitive membrane by controlling at least one of the measurement target power supply and the correction membrane power supply such that a difference between the voltage of the measurement target and the voltage of the correction ion sensitive membrane decreases, and a second measuring operation for obtaining a voltage corresponding to the number of measurement ions trapped by the correction sensor unit by controlling at least one of the measurement target power supply and the correction membrane power supply such that the voltage of the measurement target and the voltage of the correction ion sensitive membrane have potentials different from each other, and the second measuring operation may be performed every time when the first measuring operation is executed n times (n is an integer of greater than or equal to 2).

According to such a configuration, the correction sensor unit performs the second measuring operation every times when the first measuring operation is executed n times (n is an integer of greater than or equal to 2). That is, the second suppressing operation is performed during a period in which the second measuring operation is not performed. According to this, in the correction sensor unit, a time for performing the suppressing operation is longer than that in the measurement sensor unit. Accordingly, according to the correction sensor unit, data can be obtained in which the influence of the drift is further suppressed. On the other hand, in the measurement sensor unit, the number of times of the measuring operation is larger than that in the correction sensor unit, and thus, more data can be obtained than that in the correction sensor unit. However, in a case where the number of times of the measuring operation increases, the influence of the drift is included. Therefore, in the configuration described above, the output of the measurement sensor unit in which the influence of the drift is included but more measurement data is obtained can be corrected by using the output of the correction sensor unit in which measurement data including less influence of the drift is obtained. Accordingly, more measurement data in which the influence of the drift is suppressed can be obtained over a long period of time.

In addition, an ion concentration measuring device in another aspect obtains a concentration of measurement ions by being provided in a measurement target containing the measurement ions and non-measurement ions. The ion concentration measuring device may include: a measurement target power supply that controls a voltage of the measurement target; a measurement sensor unit that includes an ion trapping membrane selectively trapping the measurement ions to generate a voltage corresponding to the number of trapped measurement ions; a measurement membrane power supply that controls a voltage of the ion trapping membrane; and a power supply control unit that controls a size of a voltage to be output from each of the measurement target power supply and the measurement membrane power supply.

In one aspect, the measurement membrane electrode may be a striped electrode.

Advantageous Effects of Invention

According to the present invention, an ion concentration measuring device in which an ion concentration can be continuously and stably obtained over a long period of time is provided.

BRIEF DESCRIPTION OF DRAWINGS

FIG. 5 is a diagram illustrating a configuration of a pH sensor of a second embodiment.

DESCRIPTION OF EMBODIMENTS

Figure 1:
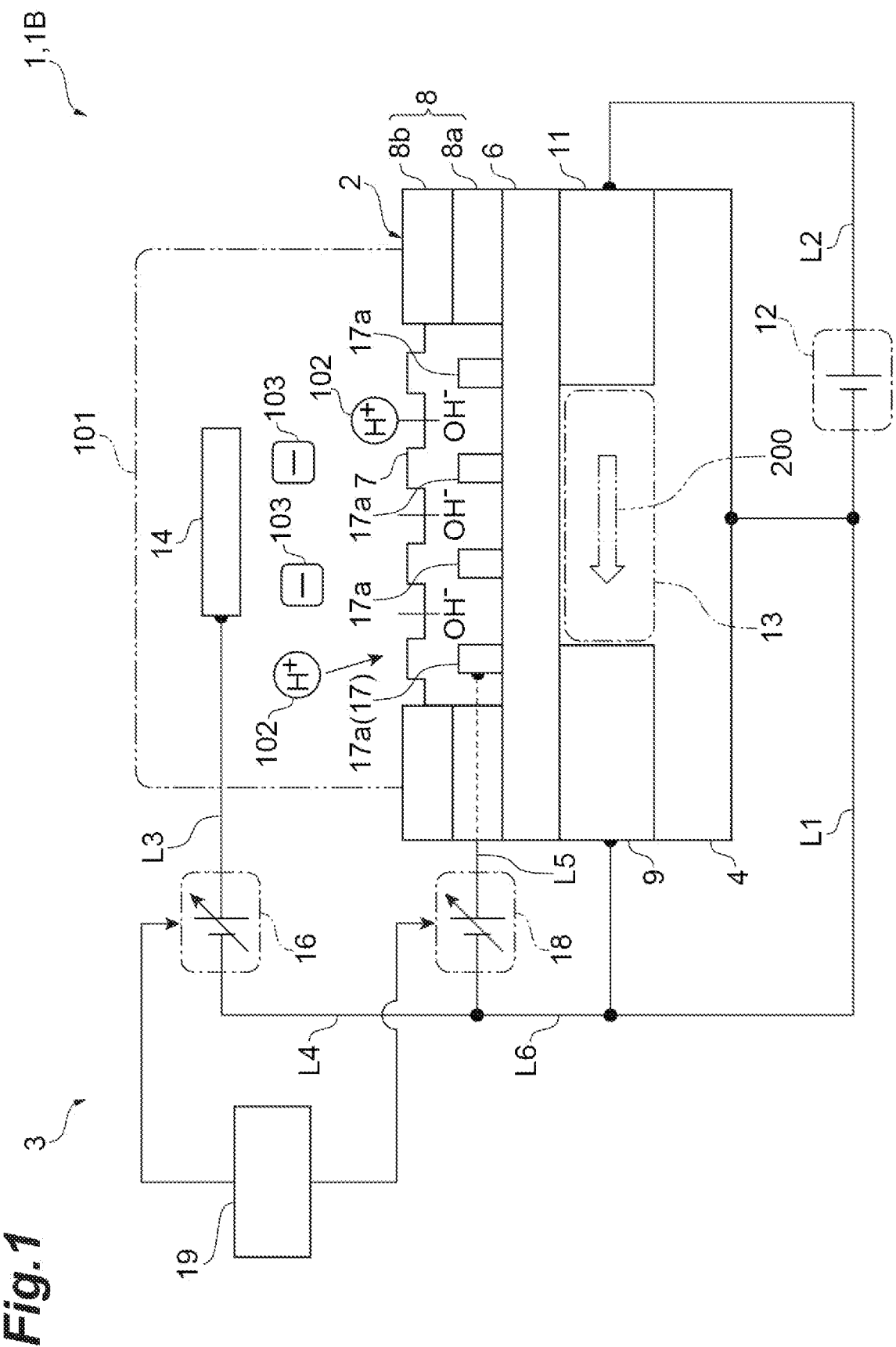
FIG. 1 is a diagram illustrating a configuration of a pH sensor of a first embodiment.

Hereinafter, modes for carrying out the present invention will be described in detail, with reference to the accompanying drawings. In the description of the drawings, the same reference numerals will be applied to the same constituents, and the repeated description will be omitted.

First Embodiment

An ion concentration measuring device illustrated in FIG. 1, for example, is disposed in a measurement target 101 that is the soil. In the following description, the ion concentration measuring device will be referred to as a "pH sensor 1". The pH sensor 1 directly and continuously obtains the concentration of hydrogen ions that are measurement ions 102. In the following description, the concentration of the hydrogen ions will be referred to as "pH". The measurement target 101 contains the measurement ions 102 and non-measurement ions 103. As described above, the hydrogen ions are exemplified as the measurement ions 102. Hydroxide ions and the like are exemplified as the non-measurement ions 103. The pH sensor 1 includes an ion sensitive field effect transistor (ISFET). The pH sensor 1 including ISFET connects a material that is specifically adsorbed by the measurement ions 102 to a gate portion of MOSFET as a sensitive membrane. Then, the pH sensor 1 reads out a voltage change that occurs due to a difference in adsorption density of the measurement ions 102. According to such a configuration, the pH sensor 1 can be directly disposed in the soil. In addition, according to such a configuration, the downsizing and high accuracy of the pH sensor 1 can also be attained.

The pH sensor 1 includes a measurement ISFET 2 (a measurement sensor unit) and a power supply unit 3 as a main constituent.

The measurement ISFET 2 includes a substrate 4, an insulating membrane 6, a measurement ion sensitive membrane 7 (an ion trapping membrane), and a protective membrane 8. The substrate 4, for example, is configured of n-type silicon. A source 9 and a drain 11 are provided in a part of the substrate 4. The source 9 is a p-type source. The drain 11 is also a p-type drain. The source 9 is electrically connected to the substrate 4 via a line L1. According to such connection, the source 9 has the same potential as that of the substrate 4. On the other hand, the drain 11 is electrically connected to the substrate 4 via a line L2 including a substrate power supply 12. The substrate power supply 12 provides a drain voltage to the measurement ISFET 2. A potential difference between the source 9 and the drain 11 is the drain voltage.

For example, in the case of a configuration in which a measurement membrane power supply 18 is not connected, the operation (a threshold voltage) of the measurement ISFET 2 is determined by a potential difference between a measurement target power supply 16 and the substrate 4. When the measurement ISFET 2 is in an ON state, a current flows between the drain 11 and the source 9. Accordingly, the voltage of a channel 13 is an intermediate value between the voltage of the drain 11 and the voltage of the source 9. At this time, the voltage of the substrate power supply 12 is larger than the voltage of the measurement target power supply 16 (Threshold Voltage<Voltage of Measurement Target Power Supply 16<Voltage of Substrate Power Supply 12). As a result thereof, the measurement ISFET 2 may not be capable of sufficiently suppressing a drift described below.

According to the measurement membrane power supply 18, a condition for suppressing a drift in an output voltage described below and a condition for operating the measurement ISFET 2 can be compatible. The condition for suppressing the drift in the output voltage indicates that the voltage of the measurement membrane power supply 18 is smaller than the voltage of the measurement target power supply 16 (Voltage of Measurement Membrane Power Supply 18<Voltage of Measurement Target Power Supply 16). The condition for operating the measurement ISFET 2 indicates that the threshold voltage is smaller than the voltage of the measurement membrane power supply 18 and the voltage of the measurement membrane power supply 18 is smaller than the voltage of the substrate power supply 12 (Threshold Voltage<Voltage of Measurement Membrane Power Supply 18<Voltage of Substrate Power Supply 12). Accordingly, according to the measurement membrane power supply 18, unhomogeneity in the measurement ion sensitive membrane 7 is resolved. As a result thereof, the drift is easily suppressed, and thus, the drift can be sufficiently suppressed. Further, the voltage of the substrate power supply 12 as the voltage of the drain 11 can be set to a desired value.

The insulating membrane 6 is provided on the main surface of the substrate 4. The main surface includes the main surface of each of the source 9, the drain 11, and the channel 13. The insulating membrane 6, for example, is configured of silicon oxide ($SiO_2$). The insulating membrane 6 is covered with the measurement ion sensitive membrane 7 and the protective membrane 8. That is, the measurement ion sensitive membrane 7 and the protective membrane 8 are provided on the main surface of the insulating membrane 6. The measurement ion sensitive membrane 7 is provided on the channel 13 via the insulating membrane 6. That is, the measurement ion sensitive membrane 7 functions as a gate in FET. The measurement ion sensitive membrane 7 is directly contacted to the measurement target 101. The measurement ion sensitive membrane 7 selectively traps the measurement ions 102 contained in the measurement target 101. The measurement ions 102 are hydrogen ions. Accordingly, in the measurement ion sensitive membrane 7, a material having an OH group for accelerating specific adsorption with respect to hydrogen ions on the membrane surface is used. For example, in the measurement ion sensitive membrane 7, $Si_3N_4$, $Ta_2O_5$, or the like may be used. The main surface of the insulating membrane 6 that is not covered with the measurement ion sensitive membrane 7 is covered with the protective membrane 8. For example, a silicon oxide membrane 8a (SiOx) and a silicon nitride membrane 8b (SiNx) may be used as the protective membrane 8.

The power supply unit 3 includes a measurement target electrode 14, the measurement target power supply 16, a measurement membrane electrode 17, the measurement membrane power supply 18, and a power supply control unit 19.

The measurement target power supply 16 is electrically connected to the measurement target electrode 14 via a line L3. The measurement target power supply 16 is electrically connected to the source 9 by a line L4. Accordingly, the reference of the voltage of the measurement target power supply 16 is the potential of the source 9 or the potential of the substrate 4. In the following description, the reference of the voltage of the measurement target power supply 16 will be described as the potential of the source 9.

The measurement target electrode 14 and the measurement target power supply 16 keep a difference between the potential of the source 9 and the potential of the measurement target 101 constant. In other words, the measurement target electrode 14 and the measurement target power supply 16 keep the potential of the measurement target 101 based on the potential of the source 9 constant. In the following description, the difference between the potential of the source 9 and the potential of the measurement target 101 will be referred to as a "measurement target voltage ($V_T$)". The measurement target voltage ($V_T$) may be referred to as a reference voltage. The measurement target electrode 14 is disposed in the measurement target 101. For example, in a case where the measurement target 101 is the soil, the measurement target electrode 14 is disposed in the soil. The measurement target electrode 14 applies the measurement target voltage ($V_T$) to the measurement target 101. The measurement target voltage ($V_T$) is output from the measurement target power supply 16 that is connected to the measurement target electrode 14. The measurement target power supply 16 controls the measurement target voltage ($V_T$) in accordance with a control signal that is output from the power supply control unit 19. That is, the measurement target voltage ($V_T$) is variable.

The measurement membrane power supply 18 is electrically connected to the measurement membrane electrode 17 by a line L5. In addition, the measurement membrane power supply 18 is electrically connected to the source 9 by a line L6. Accordingly, the reference of a voltage that is generated by the measurement membrane power supply 18 is the potential of the source 9 or the potential of the substrate 4. The reference of the voltage that is output by the measurement membrane power supply 18 may be the potential of the measurement target power supply 16.

The measurement membrane electrode 17 and the measurement membrane power supply 18 control the voltage of the measurement ion sensitive membrane 7. That is, the pH sensor 1 according to the embodiment actively controls the voltage of the measurement ion sensitive membrane 7. The voltage of the measurement ion sensitive membrane 7 is a difference between the potential of the measurement target 101 and the potential of the measurement ion sensitive membrane 7. In the following description, the difference between the potential of the measurement target 101 and the potential of the measurement ion sensitive membrane 7 will be referred to as a "membrane voltage ($V_F$)". The potential of the measurement ion sensitive membrane 7 is the sum of a potential that is applied from the measurement membrane electrode 17 and a potential that is generated by the measurement ion sensitive membrane 7 trapping the measurement ions 102. In the following description, the potential that is applied from the measurement membrane electrode 17 will be referred to as a "membrane control voltage ($V_C$)". The reference of the membrane control voltage ($V_C$) is the potential of the source 9. The measurement membrane electrode 17 and the measurement membrane power supply 18 control the membrane control voltage ($V_C$).

The measurement membrane electrode 17 is disposed inside the measurement ion sensitive membrane 7. The measurement membrane electrode 17 is embedded in the measurement ion sensitive membrane 7. The measurement membrane electrode 17 is in the shape of a bar. In other words, the measurement membrane electrode 17 is in the shape of a stripe. The measurement membrane electrode 17 includes a plurality of electrode ridges 17a. The plurality of electrode ridges 17a are electrically connected to each other. The potentials of the plurality of electrode ridges 17a are identical to each other. The electrode ridges 17a are in contact with the main surface of the insulating membrane 6. The electrode ridges 17a extend to a predetermined direction. The predetermined direction is orthogonal to the direction of a drain current 200 flowing toward the drain 11 from the source 9. The electrode ridges 17a are separated from each other along the direction of the drain current 200. That is, a part of the measurement ion sensitive membrane 7 and the electrode ridge 17a are alternately disposed along the direction of the drain current 200. For example, an interval between the electrode ridges 17a adjacent to each other is 600 nm. The tip end surface of the electrode ridge 17a is covered with the measurement ion sensitive membrane 7. The tip end surface of the electrode ridge 17a is not exposed to the measurement target 101. The tip end surface of the electrode ridge 17a is not directly in contact with the measurement target 101.

Hereinafter, a pH sensor 1A (refer to FIG. 5) of a second embodiment described below will be described, and then, a function effect of the pH sensor 1 of the first embodiment having the configuration described above will be described in detail. In the following description, a solution will be exemplified as the measurement target 101. In addition, hydrogen ions will be exemplified as the measurement ions 102. Further, hydroxide ions will be exemplified as the non-measurement ions 103.

The pH sensor 1A is different from the pH sensor 1 of the embodiment in that the pH sensor 1A is not provided with the measurement membrane electrode 17 and the measurement membrane power supply 18. The pH sensor 1A does not actively control the membrane voltage ($V_F$) of the measurement ion sensitive membrane. In other words, the pH sensor 1A does not independently control the membrane voltage ($V_F$) of the measurement ion sensitive membrane. Other configurations of the pH sensor 1A except for the measurement membrane electrode 17 and the measurement membrane power supply 18 are the same as those of the pH sensor 1.

The pH sensor 1A applies the measurement target voltage ($V_T$) to the solution from the measurement target electrode 14. Accordingly, the measurement target 101 has the measurement target voltage ($V_T$). In a case where the hydrogen ions are selectively trapped in the measurement ion sensitive membrane 7, a membrane potential is changed. Specifically, the membrane potential increases to a positive polarity side by hydrogen ions having positive charges. In a case where the measurement target voltage ($V_T$) is compared with the membrane voltage ($V_F$), the membrane voltage ($V_F$) is higher than the measurement target voltage ($V_T$) ($V_T < V_F$). With reference to the measurement target 101, the measurement ion sensitive membrane 7 seems to be positively charged. The hydroxide ions contained in the measurement target 101 have negative charges. As a result thereof, the hydroxide ions are attracted to the measurement ion sensitive membrane 7. Further, the hydroxide ions are infiltrated to the measurement ion sensitive membrane 7. Then, the hydroxide ions are attracted to the drain voltage that is a voltage higher than the measurement target voltage ($V_T$). As a result thereof, the hydroxide ions are infiltrated into the measurement ion sensitive membrane 7. According to the infiltration of the hydroxide ions to the measurement ion sensitive membrane 7, the membrane potential decreases. The infiltration of the hydroxide ions to the measurement ion sensitive membrane 7 progresses over time. Then, the infiltration of the hydroxide ions to the measurement ion sensitive membrane 7 gradually converges.

However, the output of the pH sensor 1A is based on a gate voltage ($V_G$). The gate voltage ($V_G$) is represented by Expression (1) described below. That is, the gate voltage ($V_G$) is the sum of the measurement target voltage ($V_T$) and the membrane voltage ($V_F$).

[Expression 1]

$$V_G = V_T + V_F \quad (1)$$

Then, the membrane voltage ($V_F$) is based on the potential that is generated by the measurement ion sensitive membrane 7 trapping the hydrogen ions. On the basis of such a potential, a "pH-dependent voltage ($V_{PH}$)" is defined. The reference of the pH-dependent voltage ($V_{PH}$), for example, may be the potential of the source 9. Accordingly, Expression (1) is represented as Expression (2).

[Expression 2]

$$V_G = V_T + V_{PH} \quad (2)$$

As described above, in a case where the hydroxide ions are infiltrated to the measurement ion sensitive membrane 7, the potential of the measurement ion sensitive membrane 7 is changed in accordance with the number of hydroxide ions. A "drift voltage ($V_D$)" is defined on the basis of the potential due to the infiltrated hydroxide ions. Here, the "drift" indicates that the non-measurement ions 103 are infiltrated to the measurement ion sensitive membrane 7 over time, the charges are accumulated in the membrane, and the output voltage of the measurement ISFET 2 is changed. The reference of the drift voltage ($V_D$), for example, may be the potential of the source 9. In consideration of the drift voltage ($V_D$), the gate voltage ($V_G$) is represented as Expression (3).

[Expression 3]

$$V_G = V_T + V_{PH} + V_D \quad (3)$$

The drift voltage ($V_D$) corresponds to the number of infiltrated hydroxide ions. That is, in a case where the number of hydroxide ions that are infiltrated over time increases, the drift voltage ($V_D$) increases. As a result thereof, even in a case where the measurement target voltage ($V_T$) and the pH-dependent voltage ($V_{PH}$) are constant, the gate voltage ($V_G$) is changed due to a variation in the drift voltage ($V_D$). That is, the output of the pH sensor 1A is changed. A change in the output of the pH sensor 1A due to the drift voltage ($V_D$) is referred to as the "drift".

Regarding such a problem described above, as a result of intensive studies of the present inventors, it has been conceived that in a case where the factor of the drift is the infiltration of the non-measurement ions 103, the drift can be suppressed by suppressing the infiltration of the non-measurement ions 103. Therefore, the pH sensor 1 according to the embodiment actively controls the membrane voltage ($V_F$) of the measurement ion sensitive membrane 7, and thus, suppresses the infiltration of the non-measurement ions 103.

Figure 2:
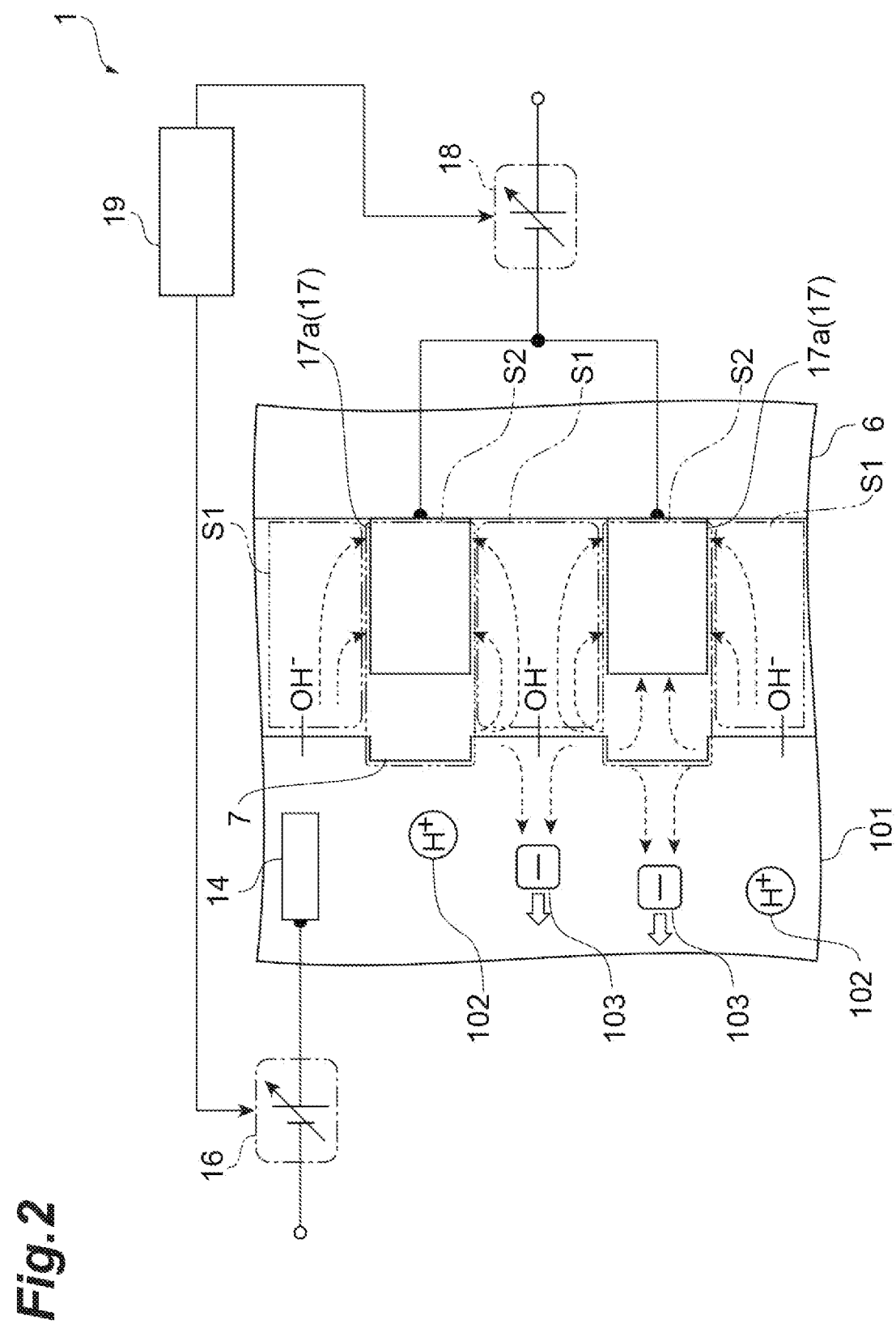
FIG. 2 is a diagram enlargedly illustrating a measurement ion sensitive membrane illustrated in FIG. 1.

As illustrated in FIG. 2, the pH sensor 1 includes the measurement membrane electrode 17 that is embedded in the measurement ion sensitive membrane 7. The measurement membrane electrode 17 provides the membrane control voltage ($V_C$). The measurement membrane electrode 17 is closer to the measurement target 101 than a drain electrode. Accordingly, the membrane voltage ($V_F$) can be defined as the sum ($V_F = V_C + V_{PH}$) of the membrane control voltage ($V_C$) and the pH-dependent voltage ($V_{PH}$) (refer to FIG. 3).

Figure 3:
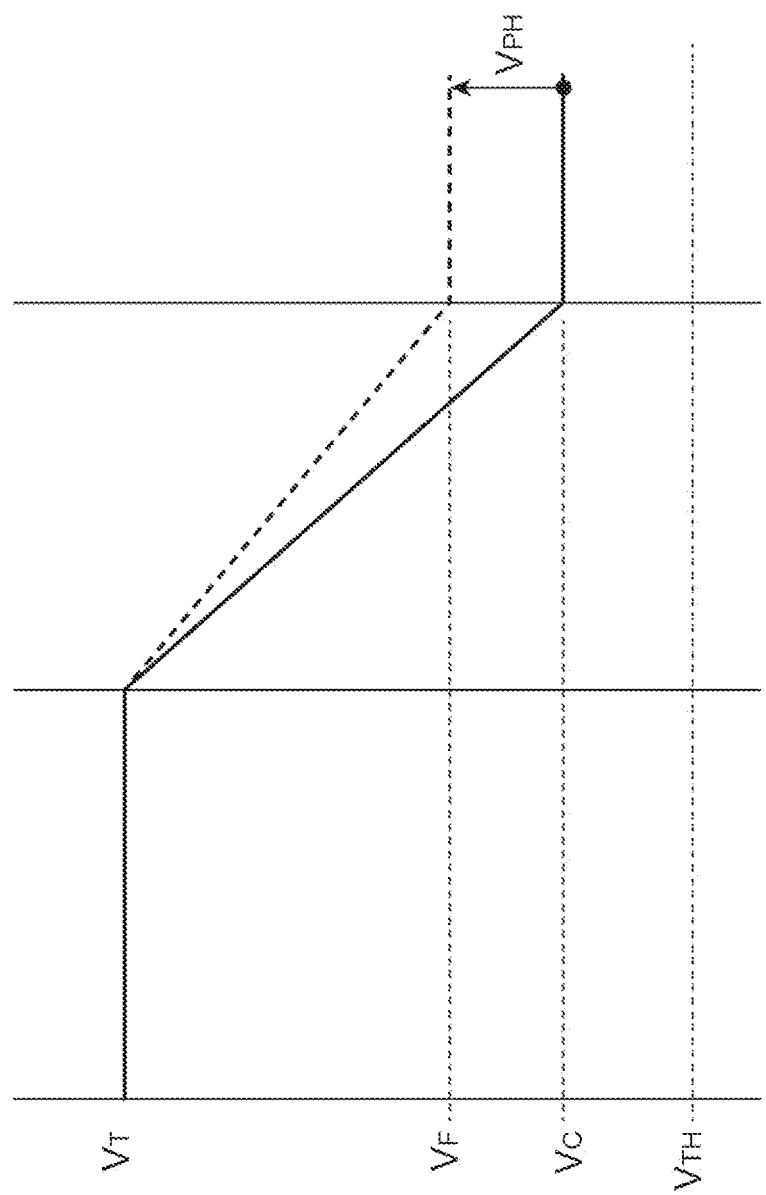
FIG. 3 is a diagram illustrating a relationship between a measurement target voltage and a membrane voltage.

According to FIG. 3, the membrane control voltage ($V_C$) is a bias voltage that actively sets the reference of the gate voltage ($V_G$). The measurement ISFET 2 is operated in a case where the gate voltage ($V_G$) is greater than or equal to a threshold voltage ($V_{TH}$). Accordingly, the membrane control voltage ($V_C$) is set to be greater than or equal to the threshold voltage ($V_{TH}$). A variation in the voltage based on the membrane control voltage ($V_C$) is the pH-dependent voltage ($V_{PH}$). The pH-dependent voltage ($V_{PH}$) corresponds to the trapped measurement ions 102.

On the basis of such a definition, the membrane control voltage ($V_C$) is set to a value satisfying Expression (4) described below. In other words, the membrane control voltage ($V_C$) is smaller than the measurement target voltage ($V_T$). In other words, the membrane control voltage ($V_C$) is smaller than the measurement target voltage ($V_T$). In addition, with reference to the measurement target 101, the measurement ion sensitive membrane 7 is negatively charged. For example, when the measurement target voltage ($V_T$) is 500 mV, the membrane control voltage ($V_C$) is 0 mV.

[Expression 4]

$$V_T > V_F = V_C + V_{PH} > V_{TH} \quad (4)$$

The measurement ion sensitive membrane 7 in which the measurement membrane electrode 17 is embedded includes a sensitive region S1 and an electrode region S2. The sensitive region S1 is formed between the electrode ridges 17a. The sensitive region S1 does not include the electrode ridge 17a in a thickness direction of the measurement ion sensitive membrane 7. According to the sensitive region S1, a change in the potential, which occurs by the measurement ions 102 trapped on the main surface of the sensitive region S1, can be obtained. Such a change in the potential is a change in the pH-causative voltage ($V_{PH}$).

The electrode region S2 includes the electrode ridge 17a. The electrode region S2 includes a part of the measurement ion sensitive membrane 7 in the thickness direction of the measurement ion sensitive membrane 7 and the electrode ridge 17a. In a case where the membrane control voltage ($V_C$) is applied to the electrode ridge 17a, an electrical field illustrated by a dashed arrow of FIG. 2 is generated inside the measurement ion sensitive membrane 7. Specifically, the electrical field is generated in the part of the measurement ion sensitive membrane 7 on the main surface of the electrode ridge 17a and the sensitive region S1.

When the membrane control voltage ($V_C$) satisfies Expression (4) described above, the electrical field due to the membrane control voltage ($V_C$) exerts a repulsive force to the non-measurement ions 103 having negative charges. The repulsive force inhibits the non-measurement ions 103 from being close to the measurement ion sensitive membrane 7. That is, the non-measurement ions 103 are difficult to approach the measurement ion sensitive membrane 7. Accordingly, the infiltration of the non-measurement ions 103 to the measurement ion sensitive membrane 7 is suppressed. As a result thereof, the drift voltage ($V_D$) in Expression (3) is not changed, and thus, the drift does not occur. Accordingly, the gate voltage ($V_G$) is stabilized.

In conclusion, the voltage of a solution 303 in the pH sensor 1 is based on the measurement target voltage ($V_T$) that is applied from the measurement target power supply 16. The membrane voltage ($V_F$) of the measurement ion sensitive membrane 7 is based on the pH-dependent voltage ($V_{PH}$) that corresponds to the trapped measurement ions 102 and the membrane control voltage ($V_C$) that is applied from the measurement membrane power supply 18. The power supply control unit 19 controls a relationship between the measurement target voltage ($V_T$) that is output from the measurement target power supply 16 and the membrane control voltage ($V_C$) that is output from the measurement membrane power supply 18. Specifically, the power supply control unit 19 controls the measurement membrane power supply 18 such that the polarity of the membrane control voltage ($V_C$) with respect to the measurement target voltage ($V_T$) is identical to the polarity of the non-measurement ions 103. According to such a relationship between the measurement target voltage ($V_T$) and the membrane control voltage ($V_C$), the non-measurement ions 103 are not attracted to the measurement ion sensitive membrane 7. As a result thereof, the drift in the output of the measurement ISFET 2, which occurs due to the action of the non-measurement ions 103 on the measurement ion sensitive membrane 7, can be suppressed. Accordingly, the pH sensor 1 is capable of continuously and stably obtaining pH over a long period of time.

In other words, the electrode ridge 17a of the measurement membrane electrode 17 that generates the electrical field for suppressing the infiltration of the non-measurement ions 103 is provided to be adjacent to the sensitive region S1 for capturing a potential difference between the potential of the measurement target 101 and the potential of the source 9, in the measurement ion sensitive membrane 7. The pH sensor 1 controls a potential difference between the measurement target 101 and the measurement ion sensitive membrane 7. As a result thereof, the infiltration of the non-measurement ions 103 to the measurement ion sensitive membrane 7 is suppressed. Further, the potential of the threshold voltage ($V_{TH}$) at which pH can be measured can also be kept. The infiltration of the non-measurement ions 103 is suppressed, and thus, the drift is suppressed. As a result thereof, the infiltration of the non-measurement ions 103 to the measurement ion sensitive membrane 7 can be suppressed while pH is measured. Accordingly, stable measurement can be attained over a long period of time.

When the polarity of the non-measurement ions 103 is negative, the power supply control unit 19 controls the measurement membrane power supply 18 such that the membrane control voltage ($V_C$) is smaller than the measurement target voltage ($V_T$). According to such a configuration, the drift due to the non-measurement ions 103 of which the polarity is negative can be suppressed.

The pH sensor 1 further includes the measurement membrane electrode 17 that is connected to the measurement membrane power supply 18 and is embedded in the measurement ion sensitive membrane 7. The electrical field is generated inside the measurement ion sensitive membrane 7. According to such a configuration, the gradient of the electrical field can be increased. Accordingly, the non-measurement ions 103 are difficult to approach the measurement ion sensitive membrane 7. As a result thereof, the drift due to the non-measurement ions 103 can be further suppressed.

The measurement membrane electrode 17 is a striped electrode including the plurality of electrode ridges 17a. According to such a configuration, the infiltration of the non-measurement ions 103 to the measurement ion sensitive membrane 7 can be suppressed. Further, according to such a configuration, pH can be measured.

Figure 4A:
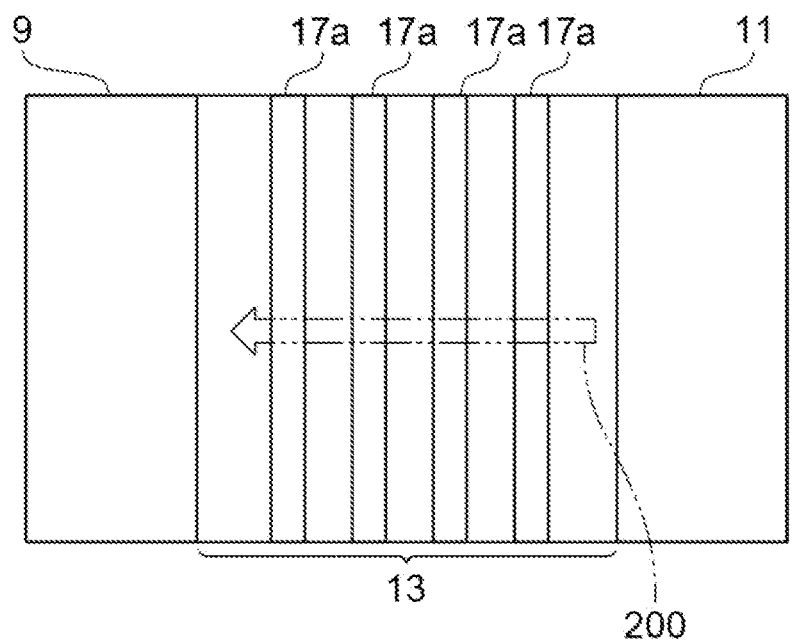
FIG. 4(a) is a diagram schematically illustrating a membrane electrode.

As illustrated in FIG. 4(a), the electrode ridges 17a extend to a direction intersecting with the direction of the drain current 200 flowing between the source 9 and the drain 11 of the measurement ISFET 2. In addition, the electrode ridges 17a are separated from each other along the direction of the drain current. According to such a configuration, a potential difference that is generated by the measurement ion sensitive membrane 7 can be preferably captured.

Figure 4B:
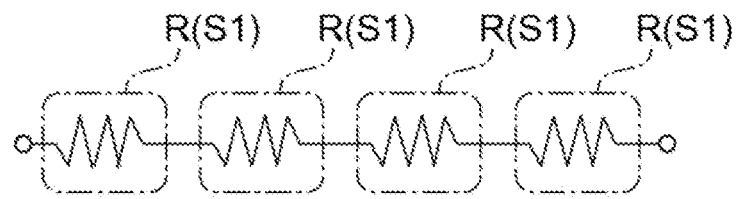
FIG. 4(b) is a diagram illustrating an equivalent circuit of a configuration illustrated in FIG. 4(a).

FIG. 4(b) is an equivalent model of an electrical circuit of the configuration illustrated in FIG. 4(a). In the measurement ion sensitive membrane 7, the pH-dependent voltage ($V_{PH}$) is changed in accordance with the measurement ions 102 being trapped. As a result thereof, the gate voltage ($V_G$) is changed (refer to Expression (3)). Then, the ease of flow of the drain current in the channel 13 between the source 9 and the drain 11 (that is, electrical resistance) is changed in accordance with the gate voltage ($V_G$). Accordingly, as illustrated in FIG. 4(b), the configuration illustrated in FIG. 4(a) can be modeled as a plurality of resistance components R connected in series, in the electrical connection between the source 9 and the drain 11. The resistance component R corresponds to the sensitive region S1 not including the electrode ridge 17a.

In the series connection model illustrated in FIG. 4(b), a change in the size of each of the resistance components R is sensitively reflected in the drain current. Accordingly, a change in the pH-dependent voltage ($V_{PH}$) is preferably captured. As a result thereof, pH with excellent accuracy can be obtained.

Second Embodiment

The pH sensor 1A of the second embodiment will be described with reference to FIG. 5. The pH sensor 1A of the second embodiment is different from the pH sensor 1 of the first embodiment in that the pH sensor 1A is not provided with the measurement membrane power supply 18 and the measurement membrane electrode 17. The other configurations of the pH sensor 1A are the same as the configurations of the pH sensor 1 according to the first embodiment.

In the description of the function effect of the first embodiment, an operation is exemplified in which the pH sensor 1A does not control the membrane voltage ($V_F$). However, the infiltration of the non-measurement ions 103 is based on a difference between the measurement target voltage ($V_T$) and the membrane voltage ($V_F$). Therefore, the measurement target voltage ($V_T$) is actively controlled, and thus, a condition for enabling the infiltration to be suppressed may be satisfied. The pH sensor 1A of the second embodiment actively controls the measurement target voltage ($V_T$), and thus, suppresses the infiltration of the non-measurement ions 103.

The power supply control unit 19 of the pH sensor 1A controls the measurement target voltage ($V_T$) that is output from the measurement target power supply 16. The power supply control unit 19 performs a first operation. In the first operation, a first measurement target voltage ($V_{T1}$) is provided to the measurement target 101 via the measurement target electrode 14. The first operation is continued only for a predetermined time set in advance. In a state in which the first measurement target voltage ($V_{T1}$) is provided to the measurement target 101, the output voltage is obtained from the measurement ISFET 2. Accordingly, the first operation is a measuring operation. The output voltage corresponds to the degree of measurement ions 102 being trapped in the measurement ion sensitive membrane 7. The first measurement target voltage ($V_{T1}$) is larger than the threshold voltage ($V_{TH}$) of the measurement ISFET 2. At this time, a relationship between the first measurement target voltage ($V_{T1}$) and the membrane voltage ($V_F$) is represented by Expression (5). The membrane voltage ($V_F$) is larger than the first measurement target voltage ($V_{T1}$).

[Expression 5]

$$V_{T1} < V_F \qquad (5)$$

After a lapse of a predetermined time, the power supply control unit 19 performs a second operation. In the second operation, the power supply control unit 19 provides a second measurement target voltage ($V_{T2}$) to the measurement target 101 via the measurement target electrode 14. In the second operation, a difference between the voltage of an electrode of the drain 11 and the voltage of an electrode of the source 9 is decreased. In other words, in the second operation, the potential of the electrode of the drain 11 and the potential of the electrode of the source 9 are identical to each other. Further, in the second operation, a difference between the voltage of the electrode of the drain 11 and the voltage of an electrode of the substrate 4 is decreased. In other words, in the second operation, the potential of the electrode of the drain 11 and the potential of the electrode of the substrate 4 are identical to each other. The second measurement target voltage ($V_{T2}$) has the same potential as that of a source voltage ($V_S$). At the time of the second operation, a voltage difference is not generated between the source voltage ($V_S$) and the second measurement target voltage ($V_{T2}$). In other words, such a state is a state in which the source 9 is directly connected to the measurement target electrode 14. In such a state, the gate voltage ($V_G$) does not satisfy the threshold voltage ($V_{TH}$) of the measurement ISFET 2. Accordingly, the output from the measurement ISFET 2 is not obtained. On the other hand, in such a state, a relationship between the second measurement target voltage ($V_{T2}$) and the membrane voltage ($V_F$) is represented by Expression (6).

[Expression 6]

$$V_{T2} = V_F \qquad (6)$$

That is, the potential of the measurement target voltage ($V_T$) and the potential of the membrane voltage ($V_F$) are identical to each other. In such a state, a force for attracting the non-measurement ions 103 to the measurement ion sensitive membrane 7 is not generated with respect to the non-measurement ions 103 having positive charges or negative charges. Accordingly, the non-measurement ions 103 are difficult to be infiltrated to the measurement ion sensitive membrane 7. As a result thereof, the degree of drift can be reduced.

THIRD EMBODIMENT

A pH sensor 1B of a third embodiment will be described with reference to FIGS. 6(a) and 6(b). The device configuration of the pH sensor 1B is the same as the device configuration of the pH sensor 1. On the other hand, the operation of the pH sensor 1B is different from that of the pH sensor 1. Specifically, the pH sensor 1B sets the potential of the measurement target voltage (VT) and the potential of the membrane voltage (VF) to be identical to each other, as an aspect for suppressing the infiltration of the non-measurement ions 103. In other words, the pH sensor 1B decreases a difference between the measurement target voltage (VT) and the membrane voltage (VF), as the aspect for suppressing the infiltration of the non-measurement ions 103.

Figure 6A:
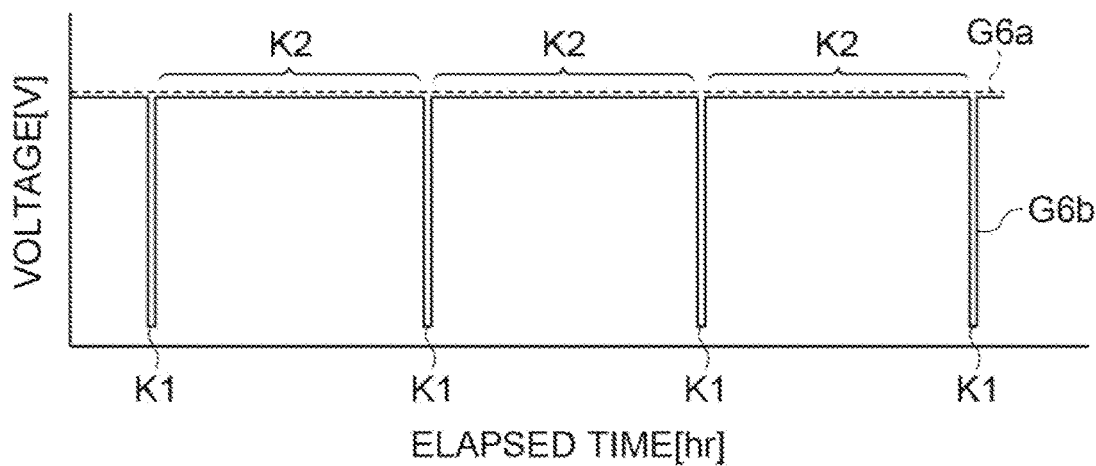
FIGS. 6(a) and 6(b) are diagrams for describing an operation of a pH sensor of a third embodiment.

FIG. 6(a) illustrates a relationship between the measurement target voltage ($V_T$) (a graph G6a) and the membrane voltage ($V_F$) (a graph G6b). A vertical axis represents a voltage. A horizontal axis represents time. The power supply control unit 19 of the pH sensor 1B repeats an operation for setting the measurement target voltage ($V_T$) and the membrane voltage ($V_F$) to have the same potential (a suppressing operation) and an operation for setting the measurement target voltage ($V_T$) to be different from the membrane voltage ($V_F$) (a measuring operation).

Specifically, the power supply control unit 19 controls the measurement target power supply 16 such that the measurement target voltage ($V_T$) is constant (refer to the graph G6a). In contrast, the power supply control unit 19 controls the measurement membrane power supply 18 such that the measurement target voltage ($V_T$) and the membrane voltage ($V_F$) have potentials different from each other ($V_T$>$V_F$) (refer to a zone K1 of the graph G6b). According to such control, the measuring operation is executed. More specifically, the membrane voltage ($V_F$) of the measurement membrane power supply 18 is controlled by the membrane control voltage ($V_C$) that is provided to the measurement ion sensitive membrane 7. As a result thereof, as illustrated in FIG. 6(b), the output voltage is obtained. Further, the power supply control unit 19 controls the measurement membrane power supply 18 such that the measurement target voltage ($V_T$) and the membrane potential ($V_F$) have the same potential ($V_T$=$V_F$) (refer to a zone K2 of the graph G6b). According to such control, the suppressing operation is executed. In this case, as illustrated in FIG. 6(b), the output voltage is not obtained.

According to such an operation, data can be obtained in which the degree of drift is reduced.

Fourth Embodiment

Figure 6B:
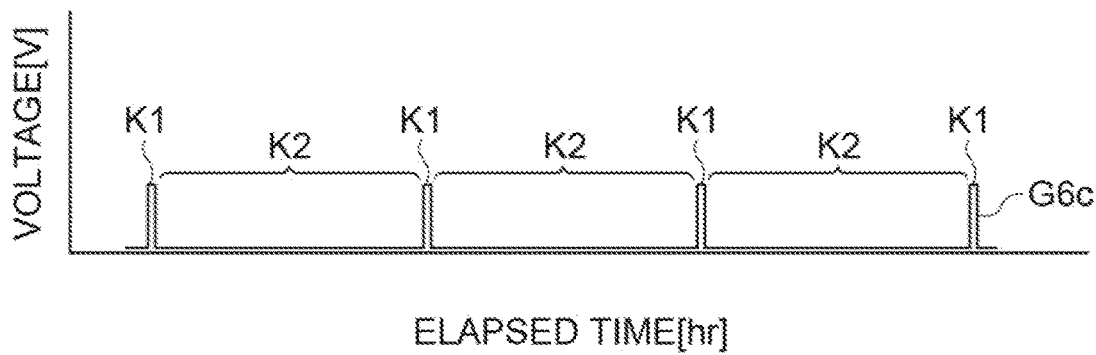

Here, in the operation of the pH sensor 1B of the third embodiment, the output is obtained from the measurement ISFET 2 at the time of the measuring operation (FIG. 6(b), refer to the zone K1). However, the infiltration of the non-measurement ions 103 to the measurement ion sensitive membrane 7 is not suppressed. On the other hand, when the pH sensor 1B performs the suppressing operation, the infiltration of the non-measurement ions 103 to the measurement ion sensitive membrane 7 is suppressed. However, the output is not obtained from the measurement ISFET 2 (FIG. 6(b), refer to the zone K2). That is, in the case of suppressing the drift, the number of times of the operation in the measuring operation (an operation time) is restricted. On the other hand, in the case of obtaining the output from more measurement ISFETs 2, the suppression of the drift is insufficient.

Therefore, a configuration in which the influence of the drift is reduced and more data is obtained is adopted in a pH sensor of a fourth embodiment.

Figure 7:
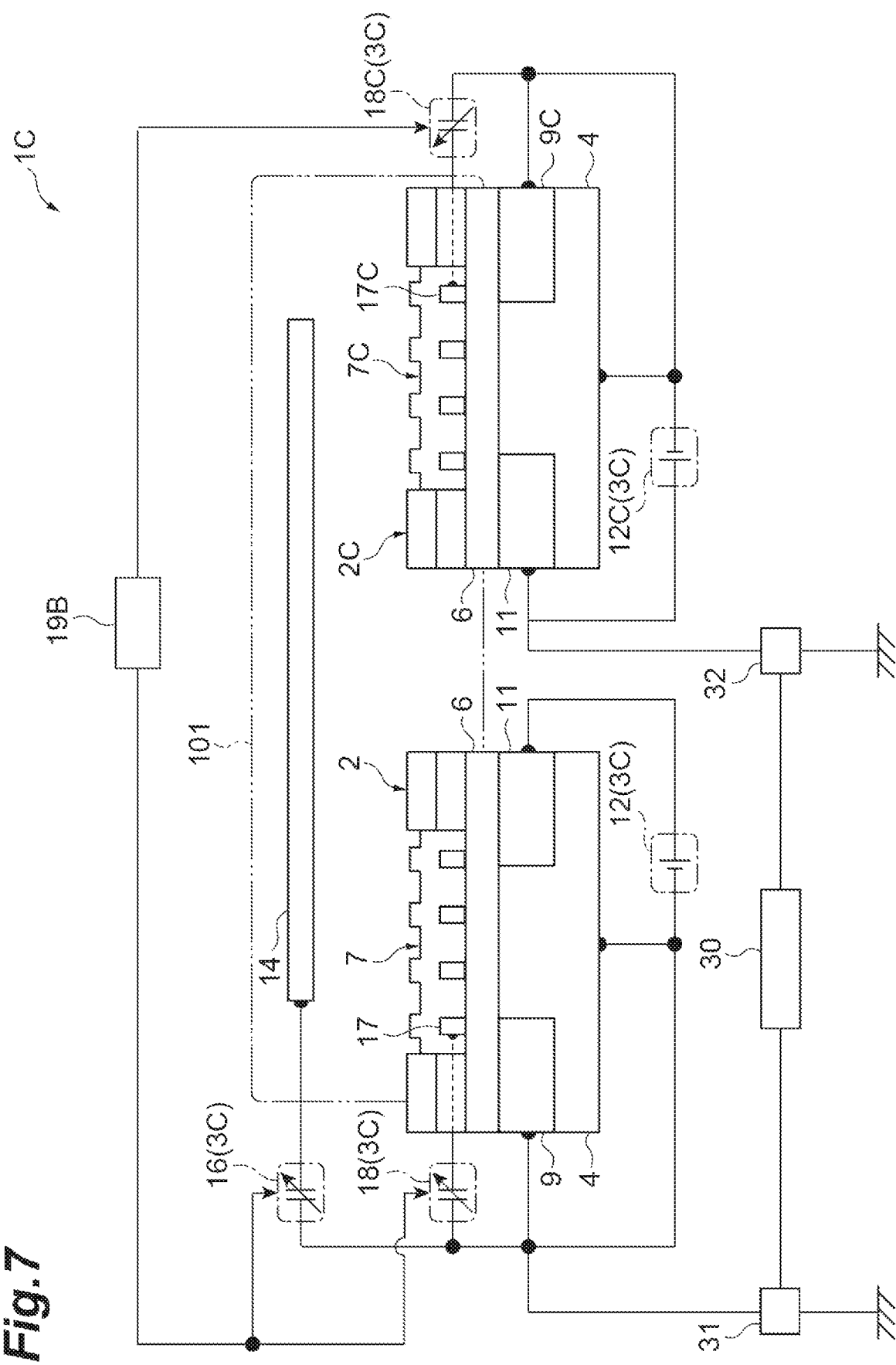
FIG. 7 is a diagram illustrating a configuration of a pH sensor of a fourth embodiment.

As illustrated in FIG. 7, a pH sensor 1C of the fourth embodiment includes the measurement ISFET 2, a correction ISFET 2C (a correction sensor unit), a power supply unit 3C, and a data processing unit 30. The pH sensor 1C obtains more output by using the measurement ISFET 2. However, the output includes the influence of the drift. Therefore, the pH sensor 1C corrects a drift component included in the output of the measurement ISFET 2 by using the output of the correction ISFET 2C. According to such a configuration, a progress situation of the drift can be grasped. After that, data for correcting the drift can be acquired. Further, according to such a configuration, measurement can be performed for a longer period.

Each of the measurement ISFET 2 and the correction ISFET 2C has the same configuration as that of the measurement ISFET 2 of the first embodiment. On the other hand, the power supply unit 3C includes the measurement target power supply 16, the measurement membrane power supply 18, a correction membrane power supply 18C, and substrate power supplies 12 and 12C. The correction membrane power supply 18C is connected to a correction membrane electrode 17C. The correction membrane electrode 17C is embedded in a correction ion sensitive membrane 7C provided in the correction ISFET 2C.

The data processing unit 30 is connected to the measurement ISFET 2 via a voltage sensor 31. The data processing unit 30 is connected to the correction ISFET 2C via a voltage sensor 32. The data processing unit 30 calculates pH of the measurement target 101, on the basis of the output voltage of the measurement ISFET 2 and the correction ISFET 2C. More specifically, the data processing unit 30 corrects the drift component included in the output voltage of the measurement ISFET 2 by using the output voltage of the correction ISFET 2C. Then, the data processing unit 30 obtains pH of the measurement target 101 by using the corrected output voltage of the measurement ISFET 2. The data processing unit 30, for example, is attained by executing a program that is described to perform the following operations, in a computer such as a personal computer and a microcomputer.

The data processing unit 30 receives data relevant to the output voltage from the measurement ISFET 2 and the correction ISFET 2C. A connection state thereof is not particularly limited. The data processing unit 30 may be connected to the measurement ISFET 2 and the correction ISFET 2C with wires. The data processing unit 30 may be connected to the measurement ISFET 2 and the correction ISFET 2C without wires. In addition, the data processing unit 30 may be connected to the measurement ISFET 2 and the correction ISFET 2C via an internet connection or the like. Further, the data relevant to the output voltage may be temporarily recorded in a data recording medium that is connected to the measurement ISFET 2 and the correction ISFET 2C. Then, the data relevant to the output voltage may be provided to the data processing unit 30 via the data recording medium.

Figure 8A:
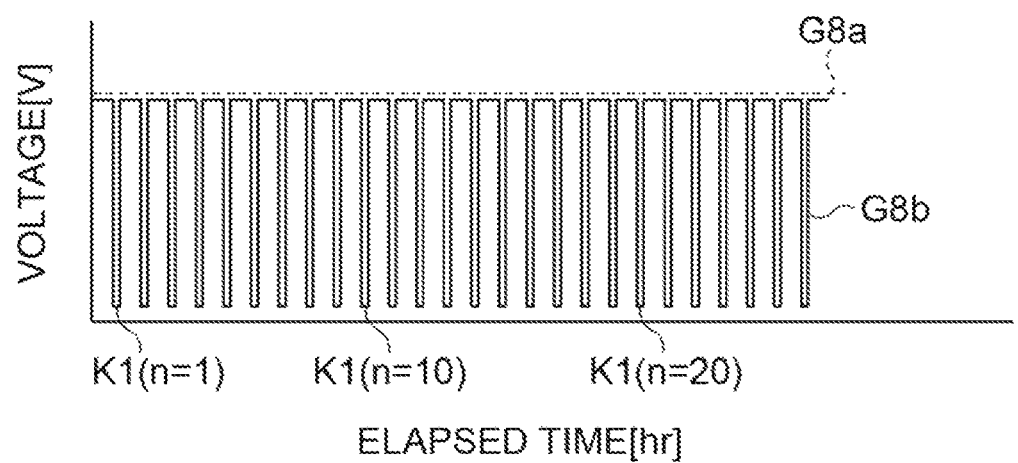
FIGS. 8(a) and 8(b) are diagrams for describing an operation of the pH sensor of the fourth embodiment.
Figure 8B:
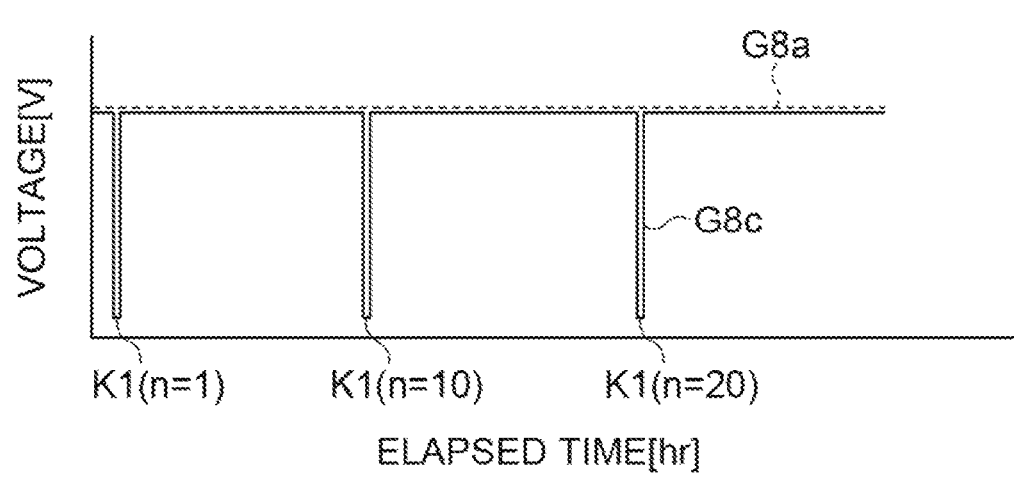
Figure 9:
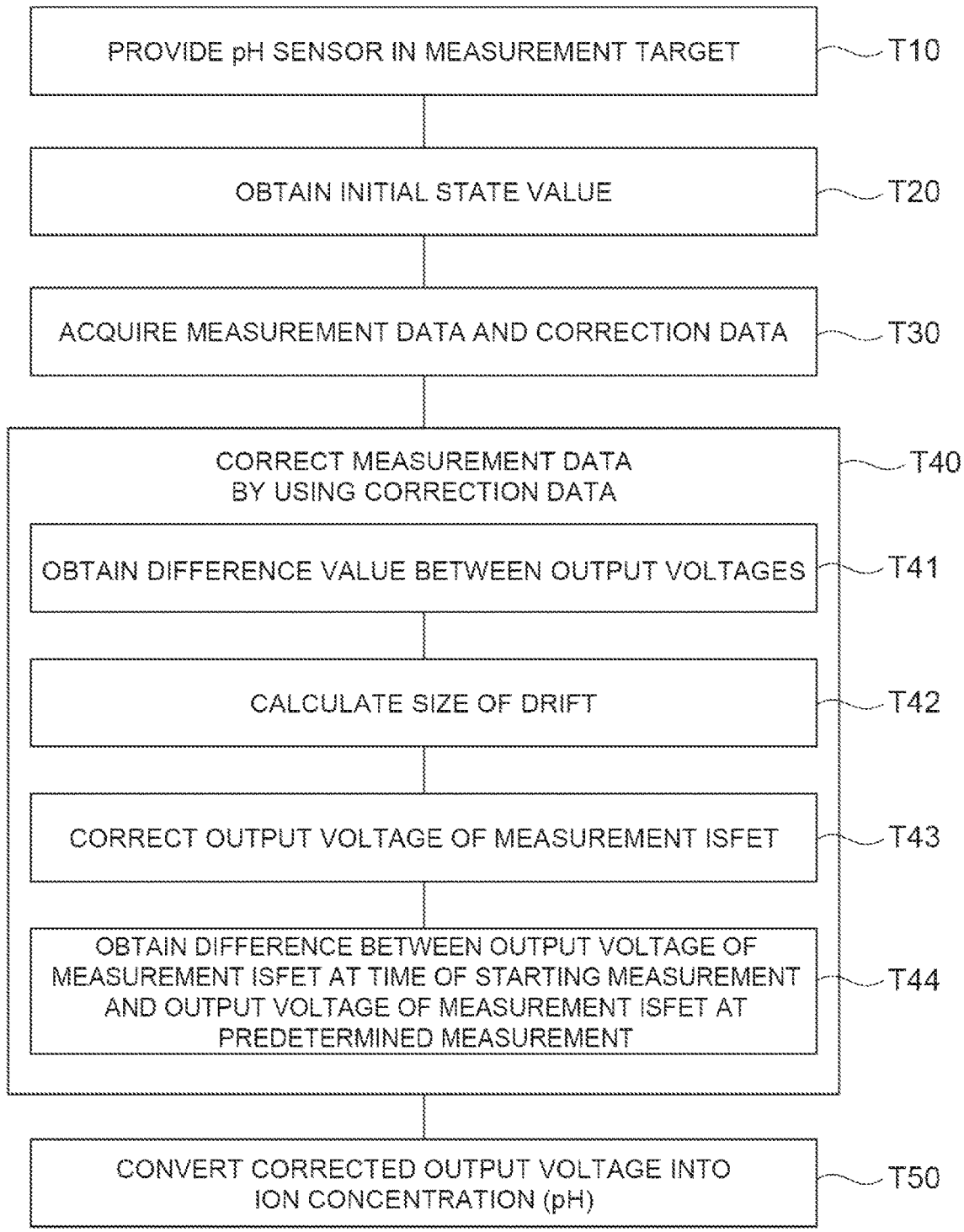
FIG. 9 is a diagram for describing an operation flow of the pH sensor of the fourth embodiment.

Hereinafter, the operation of the pH sensor 1C will be described with reference to FIGS. 8(a), 8(b), and FIG. 9. The operation of the pH sensor 1C is performed by a power supply control unit 19B and the data processing unit 30.

The pH sensor 1C is provided in the measurement target 101 (step T10). At this time, the measurement ion sensitive membrane 7 of the measurement ISFET 2 and the correction ion sensitive membrane 7C of the correction ISFET 2C are in contact with the same measurement target 101. Output properties of the measurement ISFET 2 and the correction ISFET 2C are known. For example, the output properties may include a change in the output voltage of the measurement ISFET 2 or the like with respect to a change in pH. In addition, the output properties may include an amplification factor of a circuit that is connected to the measurement ISFET 2.

Next, an initial state value at the time of starting measurement is obtained (step T20). The initial state value may include an ion concentration, an output voltage ($V_M$) of the measurement ISFET 2, and an output voltage ($V_R$) of the correction ISFET 2C. For example, the ion concentration may be obtained by using the measurement ISFET 2. The ion concentration may be obtained by using the other ion concentration measuring devices. In addition, in a case where the initial state value at the time of starting the measurement is known, step T20 may be omitted.

Measurement data and correction data are acquired (step T30). The power supply control unit 19B controls the measurement target power supply 16, and keeps the measurement target voltage ($V_T$) to a constant value (refer to a graph G8a of FIG. 8(a)). The power supply control unit 19B repeatedly executes control for setting the measurement ISFET 2 to the measuring operation and control for setting the measurement ISFET 2 to the suppressing operation (refer to a graph G8b of FIG. 8(a)). For example, in the measurement ISFET 2, a measuring operation for 15 seconds and a suppressing operation for 30 minutes are repeated.

The power supply control unit 19B controls the correction ISFET 2C, along with the operation of the measurement ISFET 2 described above. Specifically, the power supply control unit 19B repeatedly executes control for setting the correction ISFET 2C to the measuring operation and control for setting the correction ISFET 2C to the suppressing operation (refer to a graph G8c of FIG. 8(b)).

On the other hand, the cycle of the measuring operation and the suppressing operation of the correction ISFET 2C is different from the cycle of the measurement ISFET 2. The pH sensor 1C executes again the measuring operation of the correction ISFET 2C at the time of the n-th (n is an integer of greater than or equal to 2) measuring operation of the measurement ISFET 2, on the basis of when the measuring operation of the measurement ISFET 2 and the measuring operation of the correction ISFET 2C are simultaneously performed.

In the pH sensor 1C, a symbol (n) is used as a parameter for counting the measuring operation of the measurement ISFET 2. For example, n=1 indicates the first measuring operation of the measurement ISFET 2. n=10 indicates the tenth measuring operation of the measurement ISFET 2.

The number of measuring operations of the measurement ISFET 2 that are simultaneously performed with the measuring operation of the correction ISFET 2C is set to n=1. Then, when the number of times of the measuring operation of the measurement ISFET 2 is n=10, the measuring operation of the correction ISFET 2C is executed again. In other words, when the number of times of the measuring operation of the measurement ISFET 2 is n=2 to 9, the correction ISFET 2C continuously maintains the suppressing operation.

According to the operation described above, the measurement data and the correction data are obtained. Note that, a condition such as a duration time (15 seconds) of the measuring operation, a duration time (30 minutes) of the suppressing operation of the measurement ISFET 2, and a timing (n=10, 20, 30 . . . ) of the measuring operation of the correction ISFET 2C that is synchronized with the measuring operation of the measurement ISFET 2 is an example, and does not limit the contents of the present invention.

For example, the measurement ISFET 2 may be operated while switching a suppressing operation for 30 minutes and a measuring operation for 15 seconds. The correction ISFET 2C is operated while switching a continuous suppressing operation for one month and a measuring operation for 15 seconds. When the correction ISFET 2C is operated as the measuring operation, an operation timing is controlled such that the measurement ISFET 2 is also simultaneously operated as the measuring operation.

For example, in the measurement ISFET 2, the operation is switched between the measuring operation and the suppressing operation. However, in principle, it is not necessary to switch the measurement ISFET 2 to the suppressing operation, and the measurement ISFET 2 may be constantly operated as the measuring operation. On the other hand, the operation of the measurement ISFET 2 is switched between the measuring operation and the suppressing operation, and thus, the progress of the drift can be delayed. Accordingly, the ion concentration can be continuously measured over a longer period of time.

Next, the measurement data is corrected by using the correction data (step T40). Step T40 includes at least steps T41 to T44 described below.

A difference ($\Delta V_{n=1}=V_{M:n=1}-V_{R:n=1}$) between an output voltage ($V_{M:n=1}$) of the measurement ISFET 2 and an output voltage ($V_{R:n=1}$) of the correction ISFET 2C, which are obtained at the time of starting the measurement (the number of times of the measurement: n=1), is obtained (step T41).

Next, the size of the drift is calculated (step T42). For example, a difference ($\Delta V_{n=10}$) between an output voltage ($V_{M:n=10}$) of the measurement ISFET 2 and an output voltage ($V_{R:n=10}$) of the correction ISFET 2C, at the time of the number of times of the measurement: n=10, is obtained. Then, a change amount ($\Delta V_{n=10}-\Delta V_{n=1}$) between the difference ($\Delta V_{n=10}$) and the difference ($\Delta V_{n=1}$) at the time of starting the measurement is obtained. The change amount indicates the drift that occurs at the number of times of the measurement: n=1 to 10.

Next, the output voltage ($V_{M:n=10}$) of the measurement ISFET 2 is corrected (step T43). That is, the output voltage ($V_{M:n=10}$) of the measurement ISFET 2 at the time of the number of times of the measurement: n=10 is corrected by using the change amount ($\Delta V_{n=10}-\Delta V_{n=1}$) ($V_{MR:n=10}=V_{M:n=10}+(\Delta V_{n=10}-\Delta V_{n=1})$). A value obtained by such calculation is an output voltage ($V_{MR:n=10}$) of the measurement ISFET 2 in which drift correction is performed.

The output voltage ($V_M$) of the measurement ISFET 2 at the time of not simultaneously measuring the output voltage ($V_R$) of the correction ISFET 2C may be corrected by using the most recently obtained difference data. For example, an output voltage ($V_{M:n=2\ to\ 9}$) at the number of times of the measurement: n=2 to 9 may be corrected by using the first difference data ($\Delta V_{n=1}$) or the tenth difference data ($\Delta V_{n=10}$). A relationship between the drift and a measurement integration time can be predicted to some extent. A timing for obtaining the output voltage ($V_R$) of the correction ISFET 2C may be determined on the basis of such a predictable time range. For example, the output voltage ($V_R$) of the correction ISFET 2C may be obtained every time when the output voltage ($V_M$) of the measurement ISFET 2 is acquired 10 times. In addition, the output voltage ($V_R$) of the correction ISFET 2C may be obtained every time when the output voltage ($V_M$) of the measurement ISFET 2 is acquired 100 times. For example, insofar as a drift amount (for example, 1 mV or the like) is sufficiently small with respect to pH sensitivity (for example, 59 mV/pH), the necessity for correction relatively decreases. That is, an interval for obtaining the output voltage ($V_R$) of the correction ISFET 2C may be set to be long (for example, every time when n=100, or the like).

Then, a difference between the output voltage ($V_M$) of the measurement ISFET 2 at the time of starting the measurement (n=1) and the output voltage ($V_M$) of the measurement ISFET 2 at a predetermined measurement point (n=10) is obtained (step T44). A change amount from the initial state at the time of performing the drift correction is obtained ($\Delta V_{MR:n=10}=V_{M:n=1}-V_{MR:n=10}$).

Finally, the corrected output voltage ($\Delta V_{MR:n=10}$) is converted into the ion concentration (pH) by using the output properties of the measurement ISFET 2 (step T50).

According to the operation described above, the influence of the drift is suppressed and more correction measurement data is obtained.

Modification Example 1

The embodiments of the present invention have been described, but the present invention is not limited to the embodiments described above.

Figure 10A:
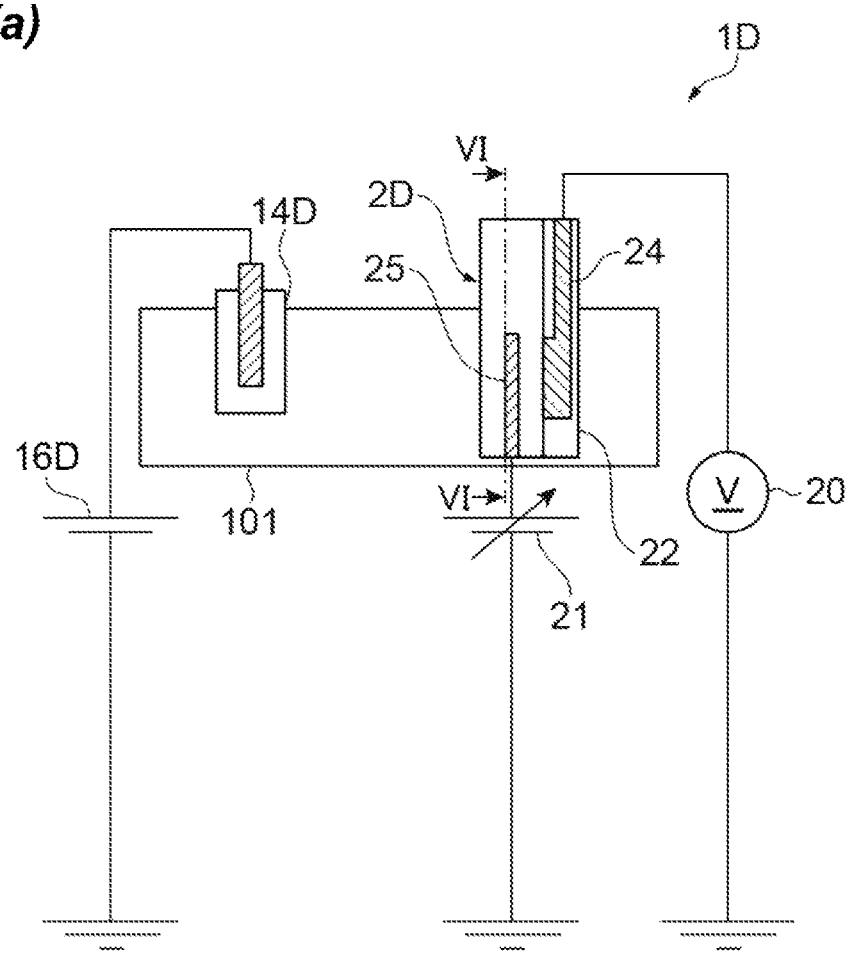
FIGS. 10(a) and 10(b) are diagrams illustrating a configuration of a pH sensor of Modification Example 1.
Figure 10B:
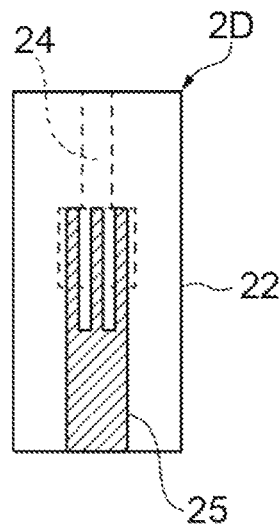

For example, the ion concentration measuring device may not include the measurement ISFET 2. For example, as illustrated in FIG. 10(a) and FIG. 10(b), a pH sensor 1D may have a simple structure. The pH sensor 1D includes a printed substrate 22, a measurement ion sensitive membrane 2D, a measurement target electrode 14D, and a measurement target power supply 16D. The printed substrate 22 includes a flat-plate electrode 24 that is connected to a voltmeter 20. The measurement ion sensitive membrane 2D is provided on the flat-plate electrode 24. An electrode 25 that is connected to a power supply 21 is embedded inside the measurement ion sensitive membrane 2D. According to such a pH sensor 1D, a relationship between the measurement target voltage ($V_T$) of the measurement target 101 and the membrane voltage ($V_F$) of the measurement ion sensitive membrane 2D can be controlled by the power supply 21 and the electrode 25 such that the relationship is a desired relationship, as with the pH sensor 1 according to the first embodiment. Accordingly, a voltage relationship is controlled such that the non-measurement ions 103 is not infiltrated to the measurement ion sensitive membrane 2D, and thus, the occurrence of the drift due to the infiltration of the non-measurement ions 103 can be suppressed.

In addition, for example, in the first embodiment described above, the non-measurement ions 103 have negative charges. The non-measurement ions 103 may have positive charges. In this case, the power supply control unit 19 controls at least one of the measurement target power supply 16 and the measurement membrane power supply 18 such that the membrane control voltage ($V_C$) is larger than the measurement target voltage ($V_T$). According to such a configuration, the drift due to the non-measurement ions 103 of which the polarity is positive can be suppressed.

In addition, the application of the ion concentration measuring device is not limited to pH measurement of the soil. For example, the ion concentration measuring device may be applied to pH measurement of a culture medium or concrete.

Further, the application of the ion concentration measuring device is not limited to the pH measurement. For example, the ion concentration measuring device can be preferably applied to a sensor performing ion adsorption and ion desorption, such as a sensor for potassium (K) ions in the soil.

Test Example 1

In Test Example 1, it was checked that the drift was capable of being suppressed when a condition satisfied Expression (4). That is, when the polarity of the non-measurement ions 103 is negative, the membrane voltage ($V_F$) is set to be lower than the measurement target voltage ($V_T$). According to such setting, it was checked that the drift was capable of being suppressed. The condition of Test Example 1 is as follows. In Test Example 1, the measurement target 101 was set to a solution having predetermined pH.

Membrane Control Voltage ($V_C$): 0 V.
Measurement Target Voltage ($V_T$): 0.5 V.
Voltage between Source and Drain: 1.5 V.
pH of Solution: 6.86.
Measurement Ions: Hydrogen Ion.
Non-Measurement Ions: Hydroxide Ion.
Type of pH Sensor: Depression n-Channel Type.

Figure 11:
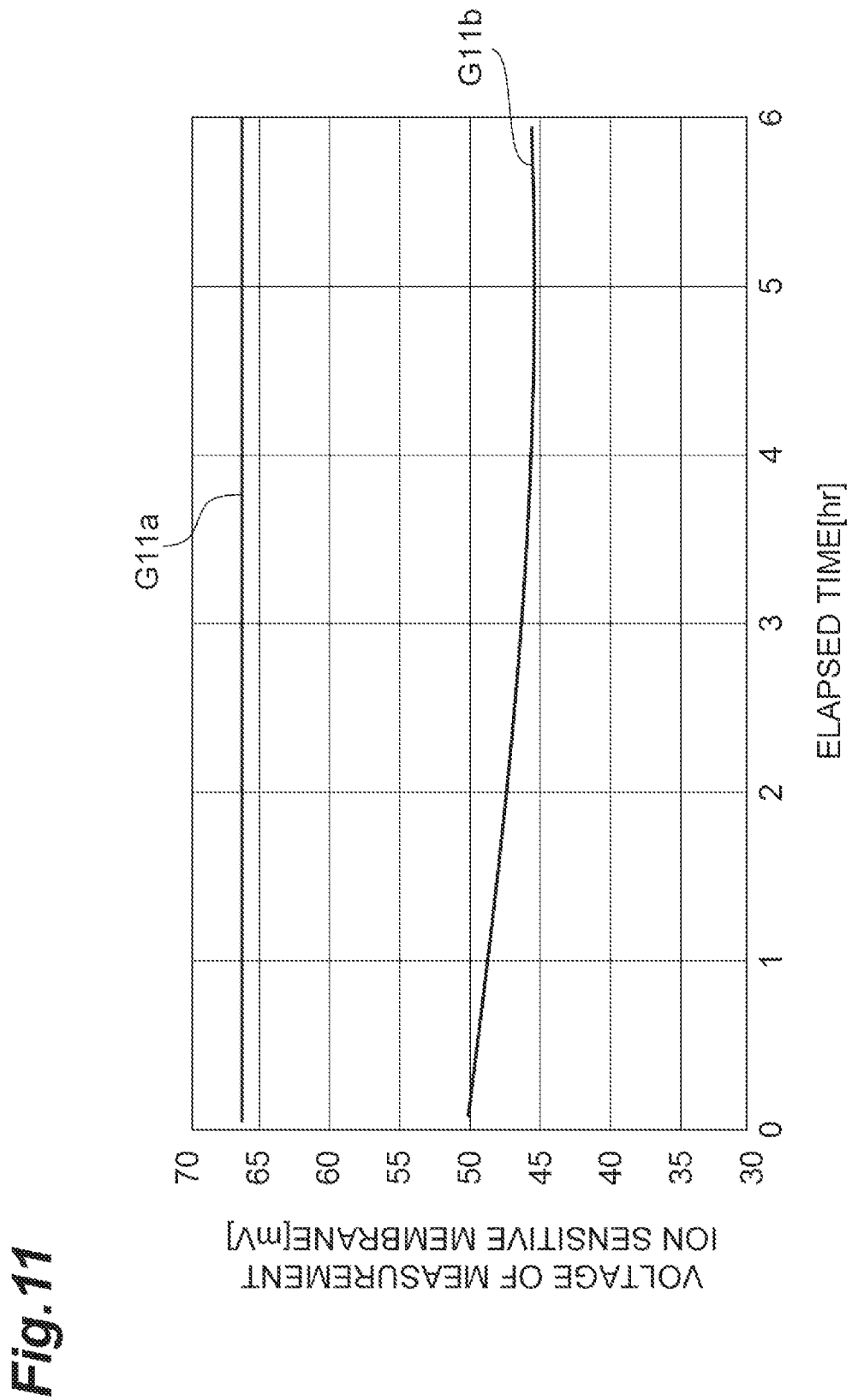
FIG. 11 is a graph showing results of Test Example 1 and Reference Example 1.

FIG. 11 shows the output of the pH sensor 1. In FIG. 11, a horizontal axis represents elapsed time. A vertical axis represents the membrane voltage ($V_F$). As shown in a graph G11a, the membrane voltage ($V_F$) at the time of starting the measurement was approximately 65 mV. Then, the membrane voltage ($V_F$) after a lapse of 6 hours from the start of the measurement was also approximately 65 mV. That is, a drift was not checked. Accordingly, it was found that the drift was able to be suppressed by satisfying the condition represented in Expression (4).

Reference Example 1

In Reference Example 1, it was checked that the drift was not capable of being suppressed when the condition did not satisfy Expression (4). That is, in a case where the membrane voltage ($V_F$) was larger than the measurement target voltage ($V_T$), it was checked that the drift occurred. The condition of Reference Example 1 is as follows. Note that, the membrane voltage ($V_F$) is the sum of the pH-dependent voltage (VETO and the membrane control voltage ($V_C$). Accordingly, the membrane voltage ($V_F$) is larger than 0 V that is the membrane control voltage ($V_C$). As with Test Example 1, in Reference Example 1, the measurement target 101 was also set to a solution having predetermined pH. The solution contains hydrogen ions as the measurement ions 102 and hydroxide ions as the non-measurement ions 103.

Membrane Control Voltage ($V_C$): 0 V.
Measurement Target Voltage ($V_T$): 0 V.
Voltage between Source and Drain: 1.5 V.
pH of Solution: 6.86.
Measurement Ions: Hydrogen Ion.
Non-Measurement Ions: Hydroxide Ion.
Type of pH Sensor: Depression n-Channel Type.

As shown in a graph G11b of FIG. 11, the membrane voltage ($V_F$) at the time of starting the measurement was approximately 50 mV. Then, the membrane voltage ($V_F$) after a lapse of 6 hours from the start of the measuring was approximately 45 mV. That is, in a case where the membrane voltage ($V_F$) was larger than the measurement target voltage ($V_T$), a drift of approximately 0.83 mV/h was capable of being checked.

TEST EXAMPLE 2

Figure 12A:
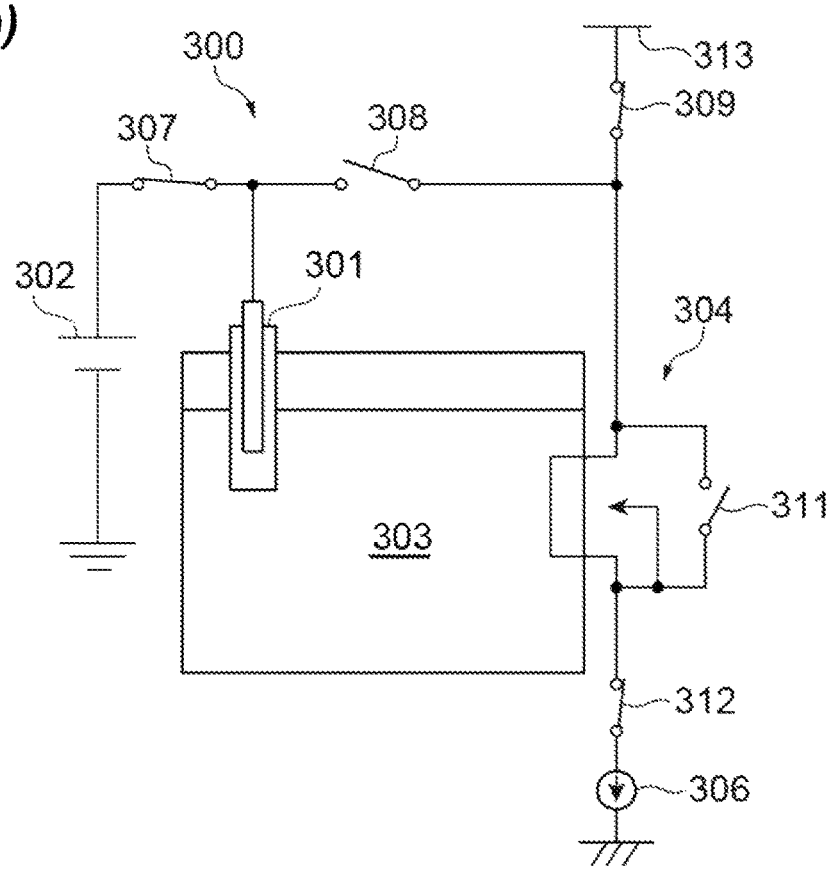
FIGS. 12(a) and 12(b) are diagrams schematically illustrating a device configuration in Test Example 2 and Reference Example 2.

In Test Example 2, it was checked that the drift was reduced by setting the measurement target voltage (VT) to be identical to the membrane voltage (VF). In Test Example 2, a pH sensor 300 having a circuit configuration illustrated in FIGS. 12(a) and (b) was used. The pH sensor 300 includes a measurement target electrode 301, a measurement target power supply 302, a measurement ISFET 304, and an ammeter 306. One end of the measurement target power supply 302 is grounded. The other end of the measurement target power supply 302 is connected to the measurement target electrode 301 via a switch 307. A source of the measurement ISFET 304 is connected to the measurement target electrode 301 via a switch 308. In addition, the source of the measurement ISFET 304 is connected to a predetermined potential 313 via a switch 309. Further, a drain of the measurement ISFET 304 is connected to the ammeter 306 via a switch 312. In addition, the drain of the measurement ISFET 304 is connected to the source via a switch 311.

Figure 12B:
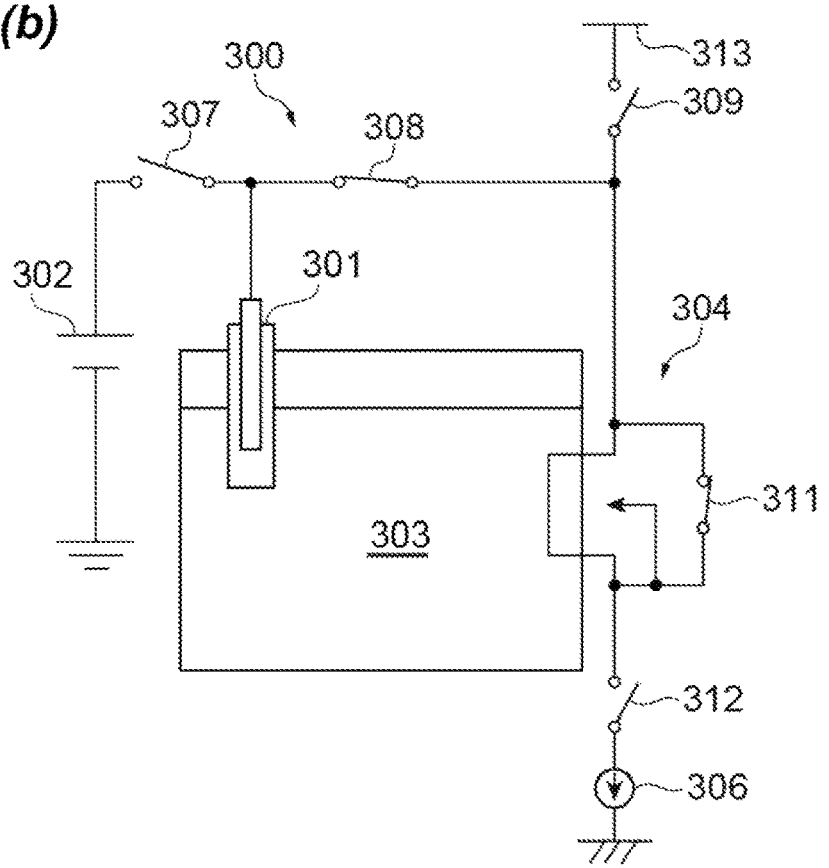

The pH sensor 300 is capable of switching the measuring operation and the suppressing operation to each other by the operation of the switches 307, 308, 309, 311, and 312. For example, as illustrated in FIG. 12(*a*), the pH sensor 300 sets the switches 307, 309, and 312 to be turned ON and sets the switches 308 and 311 to be turned OFF, and thus, performs the measuring operation. In addition, as illustrated in FIG. 12(*b*), the pH sensor 300 sets the switches 307, 309, and 312 to be turned OFF and sets the switches 308 and 311 to be turned ON, and thus, performs the suppressing operation. In such a connection configuration, the measurement target electrode 301 has the same potential as that of the measurement ISFET 304. Then, a cycle including a measuring operation for 1 minute and a suppressing operation for 12 hours was repeated a plurality of times, and thus, an output voltage of the measurement ISFET 304 was obtained. A test condition other than the above is as follows.

Measurement Target Voltage ($V_T$): 0 V.
Voltage between Source and Drain: Suppressing Operation of 0 V and Measuring Operation of 1.5 V.
pH of Solution: 6.86.
Measurement Ions: Hydrogen Ion.
Non-Measurement Ions: Hydroxide Ion.
Type of pH Sensor: Depression n-Channel Type.

Figure 13:
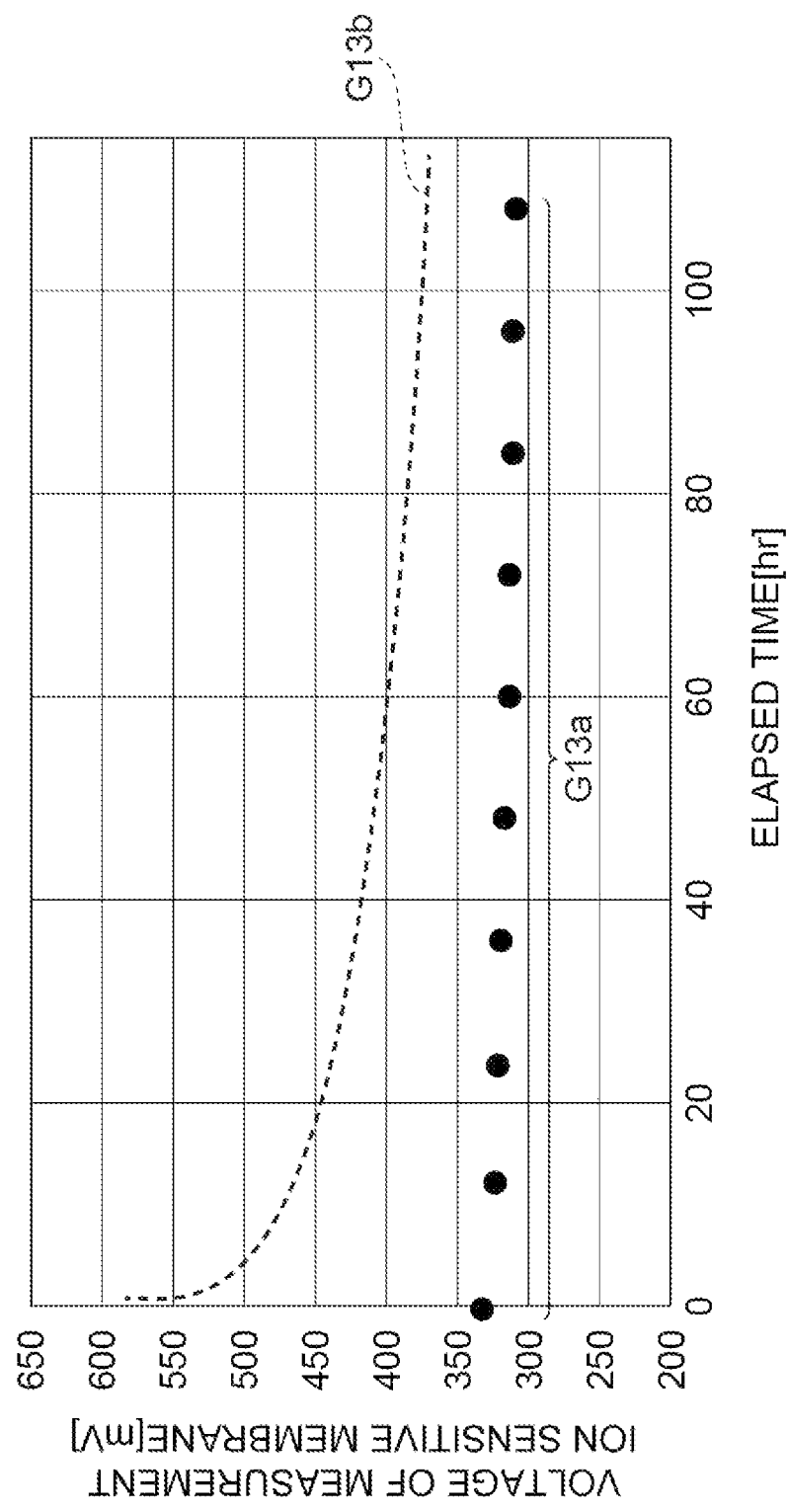
FIG. 13 is a graph showing results of Test Example 2 and Reference Example 2.

A graph G13*a* of FIG. 13 shows the results of Test Example 2. According to the graph G13*a*, the degree of drift was −0.1 mV/h. That is, it was found that the degree of drift was capable of being preferably reduced by introducing the suppressing operation.

Reference Example 2

In order for comparison with Test Example 2, a test of Reference Example 2 was also performed. In Reference Example 2, output in a case where the measuring operation was continued without being switched to the suppressing operation was obtained. The other test conditions are the same as those in Test Example 2.

A graph G13*b* of FIGS. 8(*a*) and 8(*b*) shows the results of Reference Example 2. According to Reference Example 2, it was possible to check that an apparent drift occurred over time. For example, the drift of Reference Example 2 was −0.63 mV/h, focusing on a period of 60 hours to 100 hours.

In the pH sensor of the present invention, Modification Examples described below may be further adopted.

For example, the measurement membrane electrode is not limited to the striped electrode illustrated in FIGS. 4(*a*) and 4(*b*). In the control of the potential of the measurement ion sensitive membrane 7 and ion selective membranes 61F, 61G, 65K, and 65L described below, electrodes 51A, 51B, 51C, 51E, and 51F and an electrode unit 51D of Modification Examples 2 to 7 may be adopted.

Modification Example 2

Figure 14A:
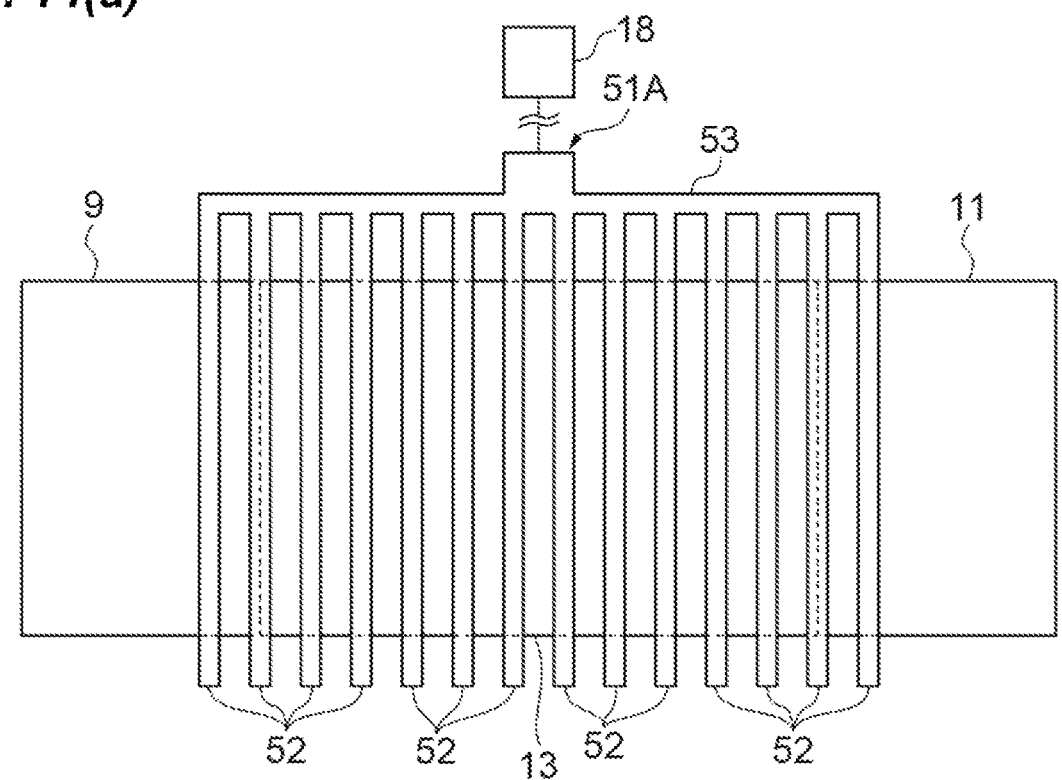
FIG. 14(a) is a diagram illustrating an electrode provided in a pH sensor of Modification Example 2.
Figure 14B:
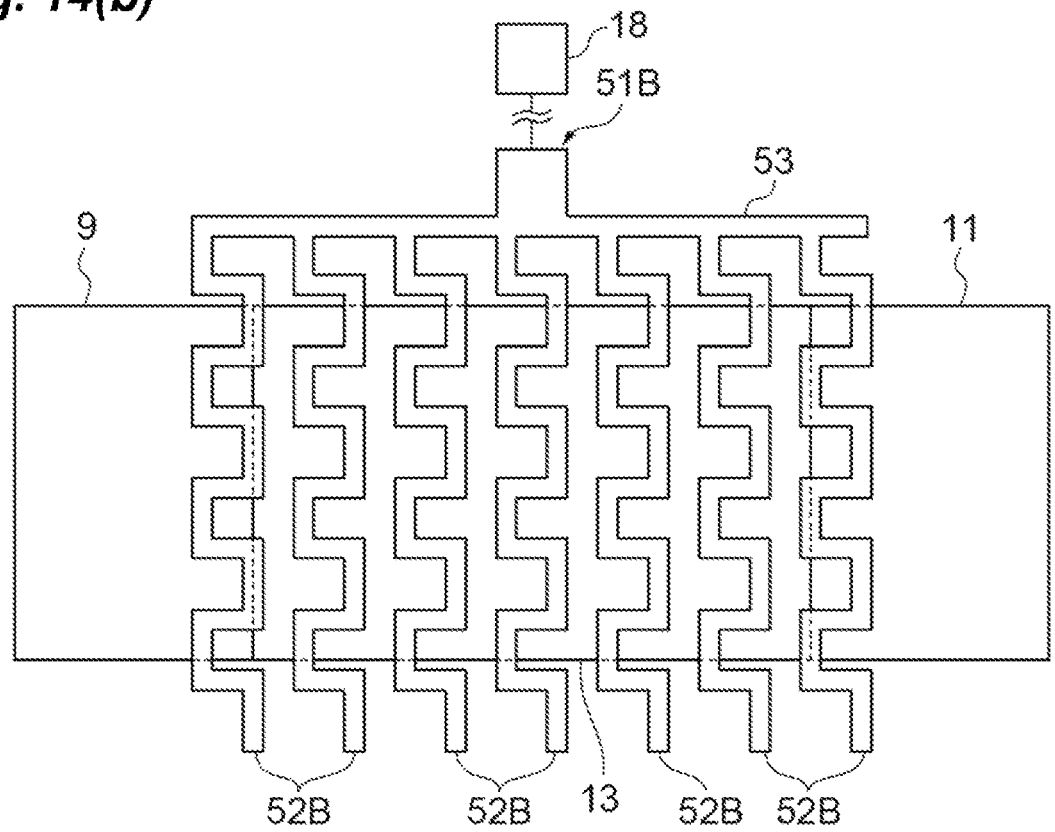
FIG. 14(b) is a diagram illustrating an electrode provided in a pH sensor of Modification Example 3.

As illustrated in FIG. 14(*a*), the electrode 51A of Modification Example 2 includes a plurality of electrode ridges 52 and a ridge connection portion 53 that electrically connects the electrode ridges 52 to each other. The electrode 51A of Modification Example 2 is a so-called interdigital electrode. The base end of the electrode ridge 52 is connected to the ridge connection portion 53. The electrode ridges 52 linearly extend to a direction separated from the ridge connection portion 53. The electrode ridges 52 are disposed to intersect with a direction toward the drain 11 from the source 9. Such an electrode 51A is capable of controlling the potential of the measurement ion sensitive membrane 7 or the like by the same electrode. In addition, according to the electrode 51A, a change in pH can be captured with excellent sensitivity in a current path.

Modification Example 3

As illustrated in FIG. 14(*b*), the electrode 51B of Modification Example 3 includes a plurality of electrode ridges 52B and a ridge connection portion 53 that electrically connects the electrode ridges 52B to each other. The base end of the electrode ridge 52B is connected to the ridge connection portion 53. The electrode ridges 52B extends to a direction separated from the ridge connection portion 53. On the other hand, unlike the electrode 51A of Modification Example 2, the electrode 51B of Modification Example 3 does not linearly extend over the entire direction separated from the ridge connection portion 53. The electrode 51B includes a portion extending to the direction separated from the ridge connection portion 53 and a portion intersecting with the direction separated from the ridge connection portion 53. Such portions are alternately disposed along the direction separated from the ridge connection portion 53. Such an electrode 51B is capable of efficiently applying a voltage to a measurement target in an unhomogeneous state.

Modification Example 4

Figure 15A:
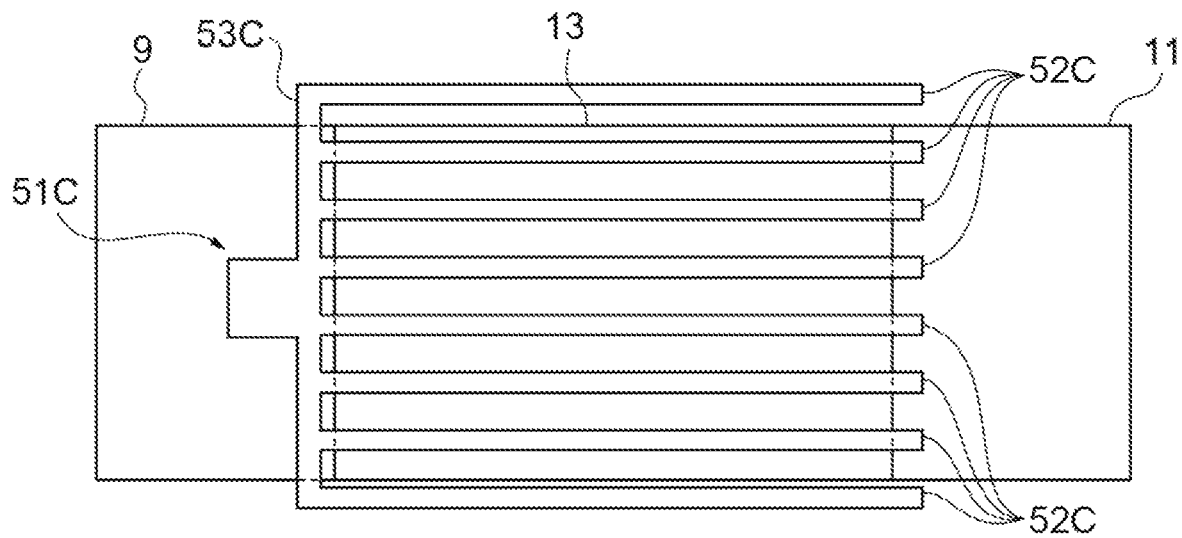
FIG. 15(a) is a diagram illustrating an electrode provided in a pH sensor of Modification Example 4.
Figure 15B:
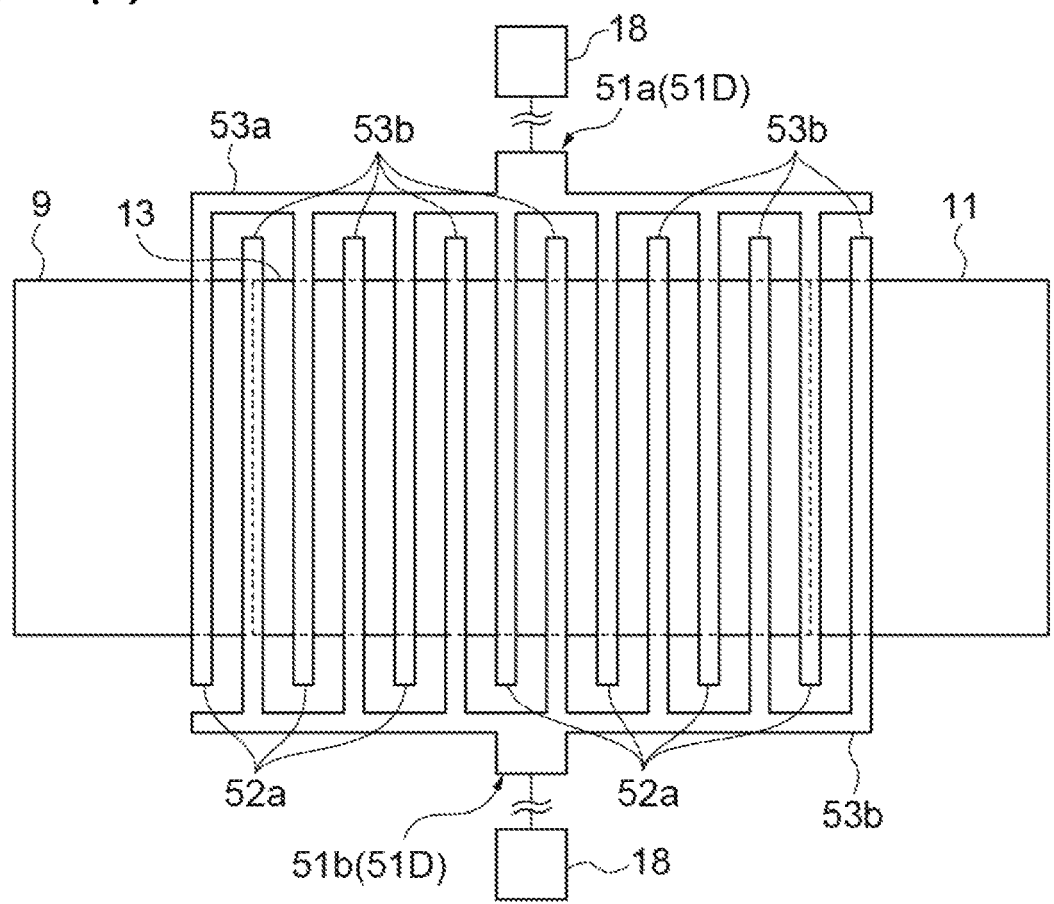
FIG. 15(b) is a diagram illustrating an electrode provided in a pH sensor of Modification Example 5.

As illustrated in FIG. 15(*a*), the electrode 51C of Modification Example 4 includes a plurality of electrode ridges 52C and a ridge connection portion 53C that electrically connects the electrode ridges 52C to each other. The electrode ridges 52C are disposed to linearly extend to the direction toward the drain 11 from the source 9. That is, in the electrode 51C of Modification Example 4, the direction of the electrode ridge 52C is different from the direction of the electrode ridge 52 of Modification Example 2. Such an electrode 51C is capable of forming a homogeneous electrical field distribution with respect to a current inflow direction. As a result thereof, the electrode 51C is capable of reducing a noise in the interface between silicon and an oxide membrane.

Modification Example 5

As illustrated in FIG. 15(*b*), the electrode unit 51D of Modification Example 5 includes a pair of electrodes 51*a* and 51*b*. Each of the electrodes 51*a* and 51*b* is electrically insulated. Then, the power supply 18 is connected to each of the electrodes 51*a* and 51*b*. The electrode 51*a* includes a plurality of electrode ridges 52*a* and a ridge connection portion 53*a* that electrically connects the electrode ridges 52*a* to each other. Similarly, the electrode 51*b* includes a plurality of electrode ridges 52*b* and a ridge connection portion 53*b* that electrically connects the electrode ridges 52*b* to each other. The electrode ridges 52*a* and 52*b* are disposed to intersect with the direction toward the drain 11 from the source 9. Then, one electrode ridge 52*b* of the other electrode 51*b* is disposed between a pair of electrode ridges 52*a* of one electrode 51*a*. That is, the electrode ridge 52*a* of one electrode 51*a* and the electrode ridge 52*b* of the other electrode 51*b* are alternately disposed toward the drain 11 from the source 9. Such an electrode unit 51D is capable of applying different voltages to the electrode 51*a* and the electrode 51*b*. As a result thereof, the electrode unit 51D is capable of separately performing an operation for suppressing the infiltration of ions and an operation for controlling a threshold voltage of a sensor. Note that, a direction to which the electrode ridges 52a and 52b extend may be the same direction as that of the current as illustrated in FIG. 15(a).

Modification Example 6

Figure 16A:
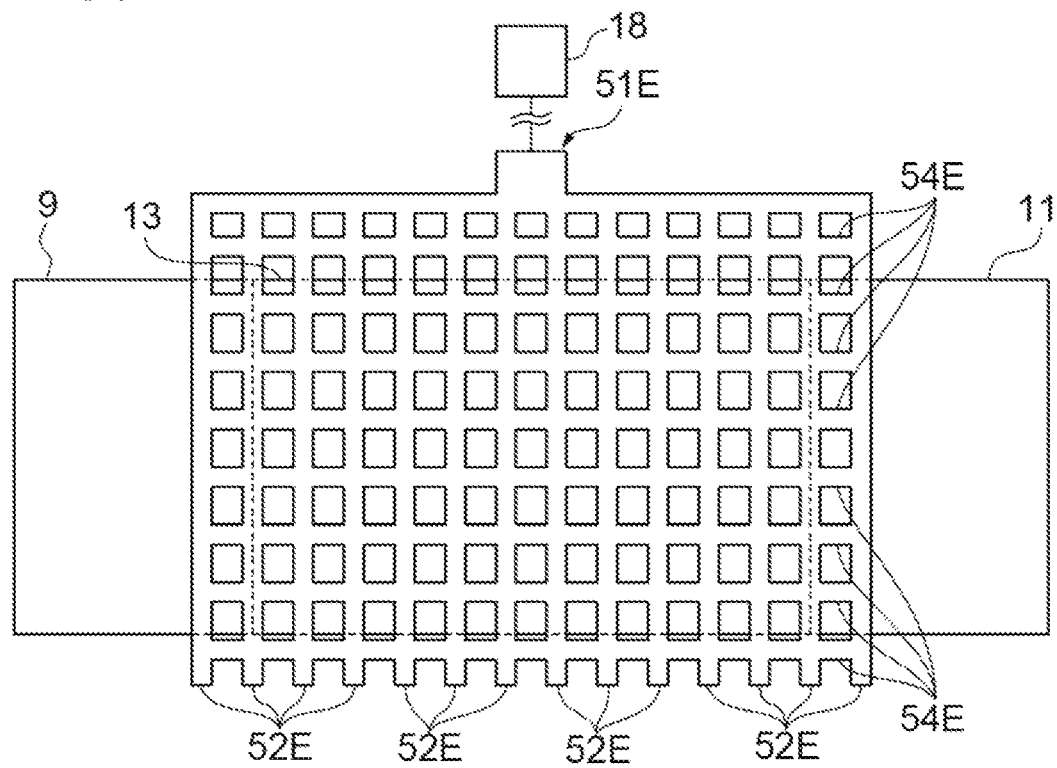
FIG. 16(a) is a diagram illustrating an electrode provided in a pH sensor of Modification Example 6.

As illustrated in FIG. 16(a), the electrode 51E of Modification Example 6 includes a plurality of electrode ridges 52E and a plurality of ridge connection portions 54E that electrically connect the electrode ridges 52E to each other. The electrode ridges 52E are disposed to intersect with the direction toward the drain 11 from the source 9. The ridge connection portions 54E are disposed along the direction toward the drain 11 from the source 9. That is, the electrode ridges 52E are orthogonal to the ridge connection portions 54E. As a result thereof, the electrode 51E is in the shape of a lattice in plan view. A portion surrounded by the electrode ridges 52E and the ridge connection portions 54E is used as a sensing hole. Such an electrode 51E is capable of applying an electrical field from four directions to surround the sensing hole. As a result thereof, the electrode 51E is capable of applying a voltage for more efficiently suppressing the infiltration of the ions.

Modification Example 7

Figure 16B:
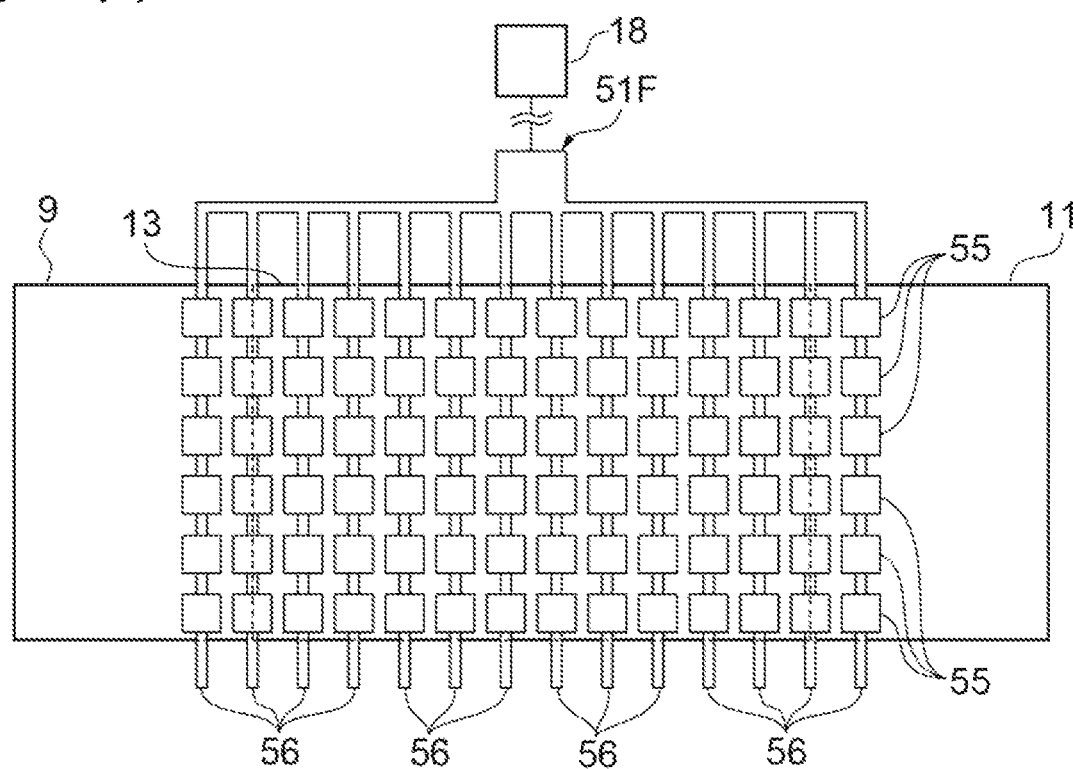
FIG. 16(b) is a diagram illustrating an electrode provided in a pH sensor of Modification Example 7.

As illustrated in FIG. 16(b), the electrode 51F of Modification Example 7 includes a plurality of electrode chips 55 and wiring 56. The plurality of electrode chips 55 are separated from each other along the direction toward the drain 11 from the source 9. Similarly, the plurality of electrode chips 55 are also separated from each other in the direction intersecting with the direction toward the drain 11 from the source 9. The wiring 56 is electrically connected to each of the plurality of electrode chips 55. The plurality of electrode chips 55 receive a voltage from the power supply 18 via the wiring 56. Such an electrode 51F is capable of applying an electrical field for suppressing the infiltration of the ions in a wide range. In addition, according to the electrode 51F, a measurement solution is easily replaced.

In addition, for example, the measurement sensor unit is not limited to the structure illustrated in FIG. 1 or the like. In the measurement sensor unit, measurement ISFETs 2F, 2G, 2H, 2K, and 2L of Modification Examples 8 to 13 illustrated in FIGS. 17(a), 17(b), 18(a), 18(b), 19(a), and 19(b) may be adopted. Note that, FIGS. 17(a), 17(b), 18(a), 18(b), 19(a), and 19(b) illustrate only the measurement ISFETs 2, 2F, 2G, 2H, 2K, and 2L. That is, in FIGS. 17(a), 17(b), 18(a), 18(b), 19(a), and 19(b), the other constituents configuring pH sensors 1, 1F, 1G, 1H, 1K, and 1L are not illustrated.

Figure 17A:
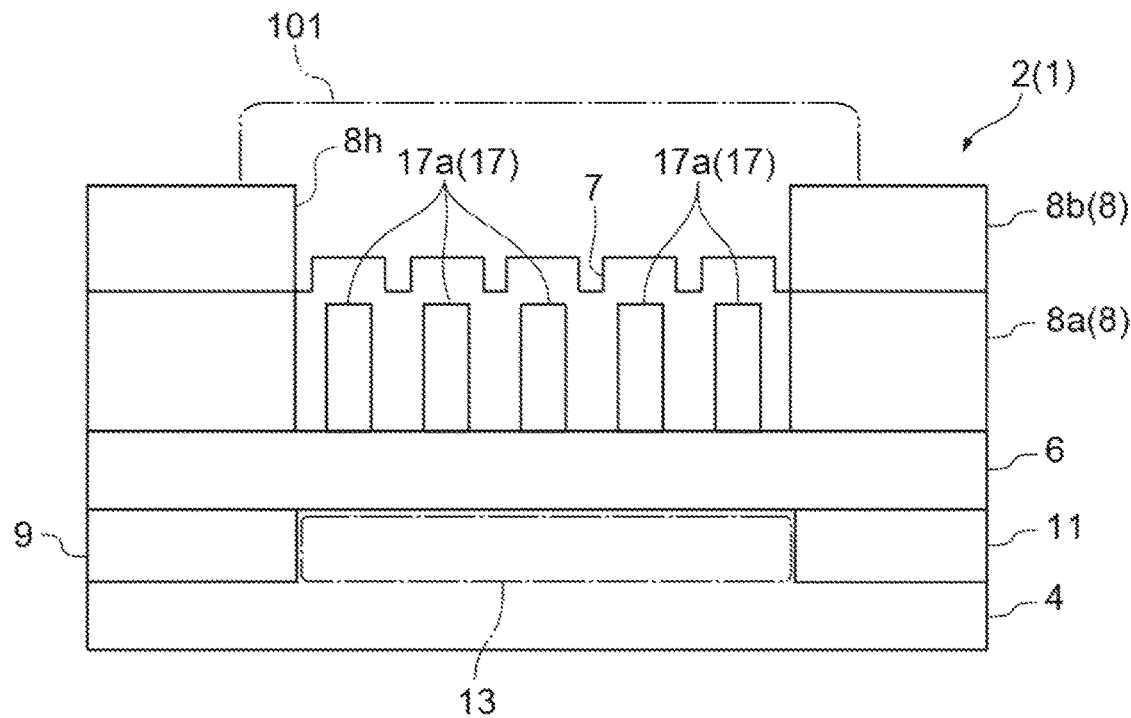
FIG. 17(a) is a diagram illustrating a measurement ISFET provided in the pH sensor of the first embodiment.

Here, the structure of the pH sensor 1 of the first embodiment will be simply described again, with reference to FIG. 17(a). The pH sensor 1 includes the measurement ISFET 2 and the power supply unit 3 (refer to FIG. 1 or the like). The measurement ISFET 2 includes the substrate 4, the insulating membrane 6, the measurement ion sensitive membrane 7, and the protective membrane 8.

The insulating membrane 6 that is a gate oxide membrane is provided on the main surface of the substrate 4. The main surface includes the main surface of each of the source 9, the drain 11, and the channel 13. The insulating membrane 6, for example, is configured of silicon oxide ($SiO_2$). The insulating membrane 6 is covered with the measurement ion sensitive membrane 7 and the protective membrane 8.

The measurement ion sensitive membrane 7, for example, is a hydrogen sensitive membrane that is sensitive to hydrogen ions. The measurement ion sensitive membrane 7 is formed on the channel 13 via the insulating membrane 6. The protective membrane 8 is not provided on the main surface of the measurement ion sensitive membrane 7. In other words, the measurement ion sensitive membrane 7 is exposed from an opening 8h in the protective membrane 8. That is, the measurement ion sensitive membrane 7 is directly in contact with the measurement target 101.

The electrode 17 is disposed inside the measurement ion sensitive membrane 7. More specifically, the electrode 17 is embedded in the measurement ion sensitive membrane 7. As the configuration of the electrode 17, a bar-shaped electrode may be adopted, or the configurations of Modification Examples 2 to 7 described above may be adopted. The tip end surface of the electrode 17 is covered with the measurement ion sensitive membrane 7. The tip end surface of the electrode 17 is not exposed to the measurement target 101.

Modification Example 8

Figure 17B:
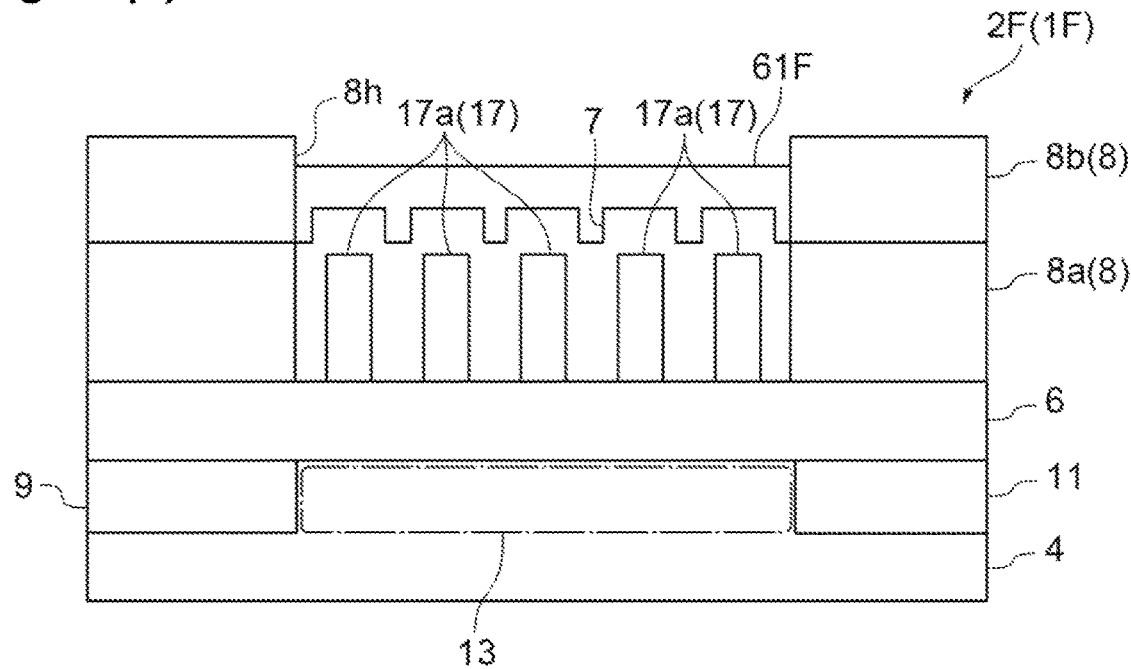
FIG. 17(b) is a diagram illustrating a measurement ISFET provided in a pH sensor of Modification Example 8.

As illustrated in FIG. 17(b), the pH sensor 1F of Modification Example 8 includes the measurement ISFET 2F and the power supply unit 3 (refer to FIG. 1 or the like). The pH sensor 1F of Modification Example 8 further includes the ion selective membrane 61F (the ion trapping membrane), in addition to the configuration of the pH sensor 1 of Modification Example 8.

The ion selective membrane 61F captures ions, in accordance with a principle different from that of a measurement ion sensitive membrane 7E. As described above, the measurement ion sensitive membrane 7E traps ions by using properties for specifically adsorbing ions. On the other hand, the ion selective membrane 61F captures the ions in physical small bores. Specifically, the ion selective membrane 61F includes the physical small bores. The diameter of the bore corresponds to an ion radius of the ions that are a detection target. That is, the diameter of the bore is set to a predetermined dimension, and thus, desired ions can be selectively detected. Examples of a measurement target of the ion selective membrane 61F include potassium (K) ions, sodium (Na) ions, magnesium (Mg) ions, nitrate nitrogen, and phosphorus (P) ions.

The ion selective membrane 61F is provided on the measurement ion sensitive membrane 7. More specifically, the ion selective membrane 61F is provided on the main surface of the measurement ion sensitive membrane 7 that is exposed from the opening 8h of the protective membrane 8. That is, the insulating membrane 6, the measurement ion sensitive membrane 7, and the ion selective membrane 61F are stacked on the channel 13 of the substrate 4.

The pH sensor 1F of Modification Example 8 is different from the pH sensor 1 of Modification Example 8 in that the pH sensor 1F includes the ion selective membrane 61F. According to the configuration of Modification Example 8, a sensor can be easily formed by adding the ion selective membrane 61F to an element in which a manufacturing step of the measurement ISFET 2 illustrated in FIG. 17(a) has been completed.

However, in any of the case of including the measurement ion sensitive membrane 7 using specific adsorption and the case of including the ion selective membrane 61F for capturing the ions in the bores, as a configuration for trapping ions, when ions having polarity reverse to the polarity of the ions that are a selection target are infiltrated to the membrane, a drift may occur. In a case where the drift occurs, a shift occurs in a detection potential. The pH sensor 1F of Modification Example 8 includes the electrode 17 for controlling a potential. As a result thereof, the pH sensor 1F of Modification Example 8 is capable of suppressing the occurrence of the drift.

Modification Example 9

Figure 18A:
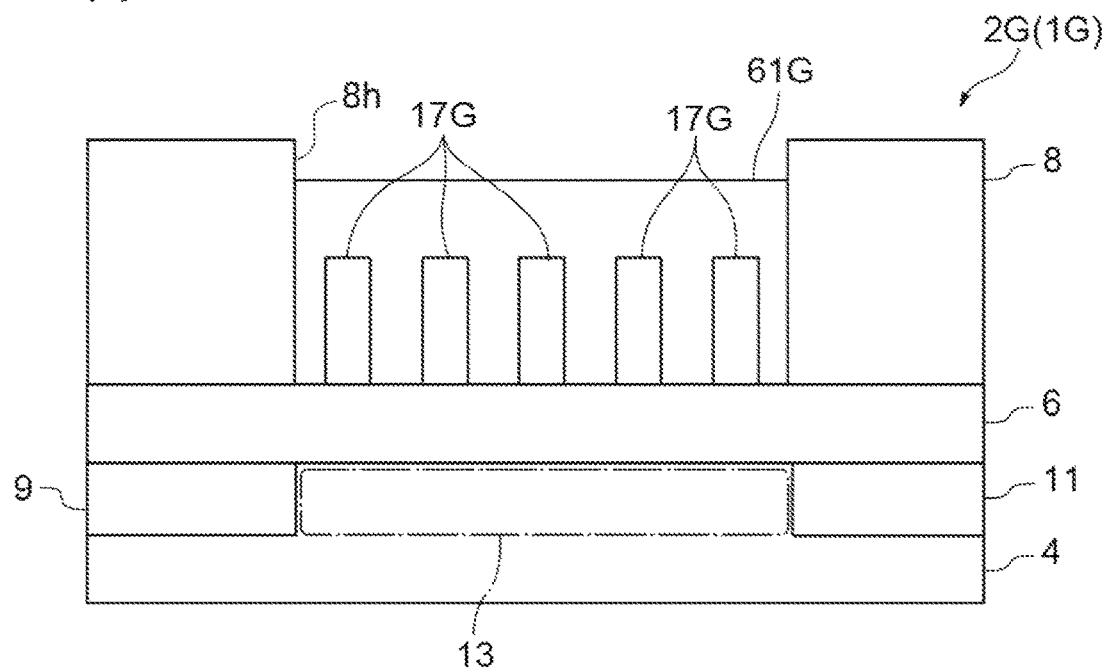
FIG. 18(a) is a diagram illustrating a measurement ISFET provided in a pH sensor of Modification Example 9.

As illustrated in FIG. 18(a), the pH sensor 1G of Modification Example 9 includes the measurement ISFET 2G and the power supply unit 3 (refer to FIG. 1 or the like). The measurement ISFET 2G includes the substrate 4, the insulating membrane 6, the protective membrane 8, and the ion selective membrane 61G That is, the pH sensor 1G of Modification Example 9 does not include the measurement ion sensitive membrane 7. Accordingly, the pH sensor 1G traps the ions that are the selection target by the ion selective membrane 61G.

The insulating membrane 6 that is the gate oxide membrane is provided on the main surface of the substrate 4. The protective membrane 8 and the ion selective membrane 61G are provided on the main surface of the insulating membrane 6. The ion selective membrane 61G is provided on the channel 13 of the substrate 4. An electrode 17G is embedded inside the ion selective membrane 61G.

The pH sensor 1G of Modification Example 9 is different from the pH sensor 1 of the first embodiment in that the measurement ion sensitive membrane 7 of the pH sensor 1 of the first embodiment is replaced with the ion selective membrane 61G In the configuration of Modification Example 9, the ion selective membrane 61G is directly provided on the insulating membrane 6. As a result thereof, in the configuration of Modification Example 9, an electrical field of the electrode 17G can be strongly applied to the ion selective membrane 61G.

Modification Example 10

Figure 18B:
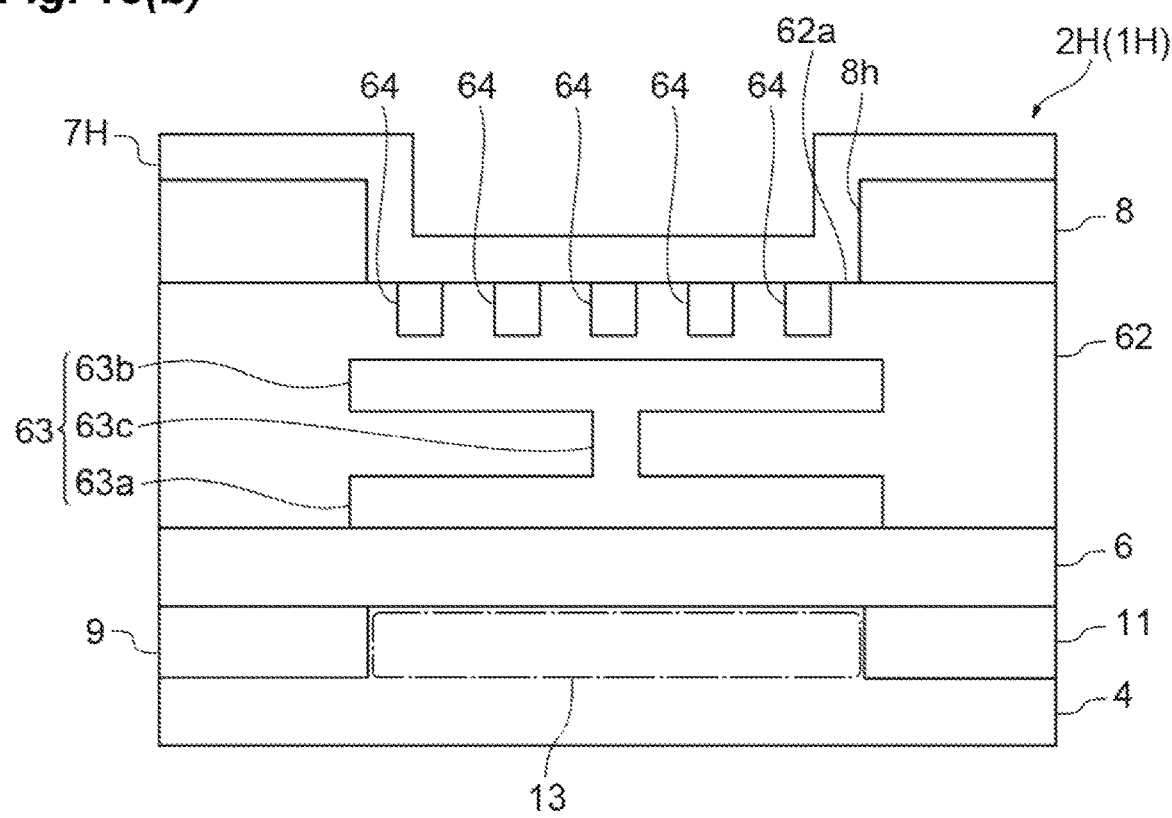
FIG. 18(b) is a diagram illustrating a measurement ISFET provided in a pH sensor of Modification Example 10.

As illustrated in FIG. 18(b), the pH sensor 1H of Modification Example 10 includes the measurement ISFET 2H and the power supply unit 3 (refer to FIG. 1 or the like). The measurement ISFET 2H includes the substrate 4, the insulating membrane 6, a measurement ion sensitive membrane 7H, and the protective membrane 8. Further, the measurement ISFET 2H includes an embedded membrane 62, a detection unit 63, and an electrode 64.

The insulating membrane 6 that is the gate oxide membrane is provided on the main surface of the substrate 4. The embedded membrane 62 is provided on the main surface of the insulating membrane 6. The protective membrane 8 and a part of the measurement ion sensitive membrane 7H are provided on the main surface of the embedded membrane 62. Another part of the measurement ion sensitive membrane 7H is provided on the main surface of the protective membrane 8.

A step of providing the embedded membrane 62 is an additional step for providing a detection membrane that detects ions in an uppermost layer portion of a semiconductor element. Such a step is particularly effective in an element including multi-layer wiring. In the embedded membrane 62, the detection unit 63 and the electrode 64 are embedded. The embedded membrane 62 is a membrane that is different from the measurement ion sensitive membrane 7H. That is, the electrode 64 is not embedded in the measurement ion sensitive membrane 7H. The electrode 64 is provided on the main surface side of the embedded membrane 62. More specifically, the embedded membrane 62 includes a measurement main surface 62a that is exposed from the opening 8h of the protective membrane 8. The upper surface of the electrode 64 is exposed from the measurement main surface 62a. Then, the upper surface of the electrode 64 is in contact with the measurement ion sensitive membrane 7H. The lower surface of the electrode 64 does not reach the insulating membrane 6.

In the embedded membrane 62, the detection unit 63 is provided in a region between the electrode 64 and the insulating membrane 6. The detection unit 63 receives a change in the potential of the measurement ion sensitive membrane 7H due to a change in the ions, and transmits such a potential change to the insulating membrane 6. The detection unit 63 is an expandable sensing unit. The detection unit 63 is provided on the channel 13 of the substrate 4. That is, the insulating membrane 6, the detection unit 63, the electrode 64, and the measurement ion sensitive membrane 7H are stacked on the channel 13 of the substrate 4.

The detection unit 63 includes a first portion 63a, a second portion 63b, and a connection portion 63c. The first portion 63a is in contact with the main surface of the insulating membrane 6. In addition, the first portion 63a covers the channel 13. The base end of the connection portion 63c is provided in the vicinity of the center of the first portion 63a. The connection portion 63c extends toward the electrode 64 from the first portion 63a. The second portion 63b is provided on the tip end of the connection portion 63c. As with the first portion 63a, the second portion 63b covers the channel 13. A part of the embedded membrane 62 exists between the second portion 63b and the electrode 64. In addition, a part of the embedded membrane 62 also exists between the first portion 63a and the second portion 63b.

The pH sensor 1H of Modification Example 10 includes the embedded membrane 62, and the electrode 64 and the detection unit 63 are embedded in the embedded membrane 62. According to such a configuration, the step of the detection unit decreases. In addition, the measurement target is easily replaced. Further, the measurement ion sensitive membrane 7H is easily manufactured.

Modification Example 11

Figure 19A:
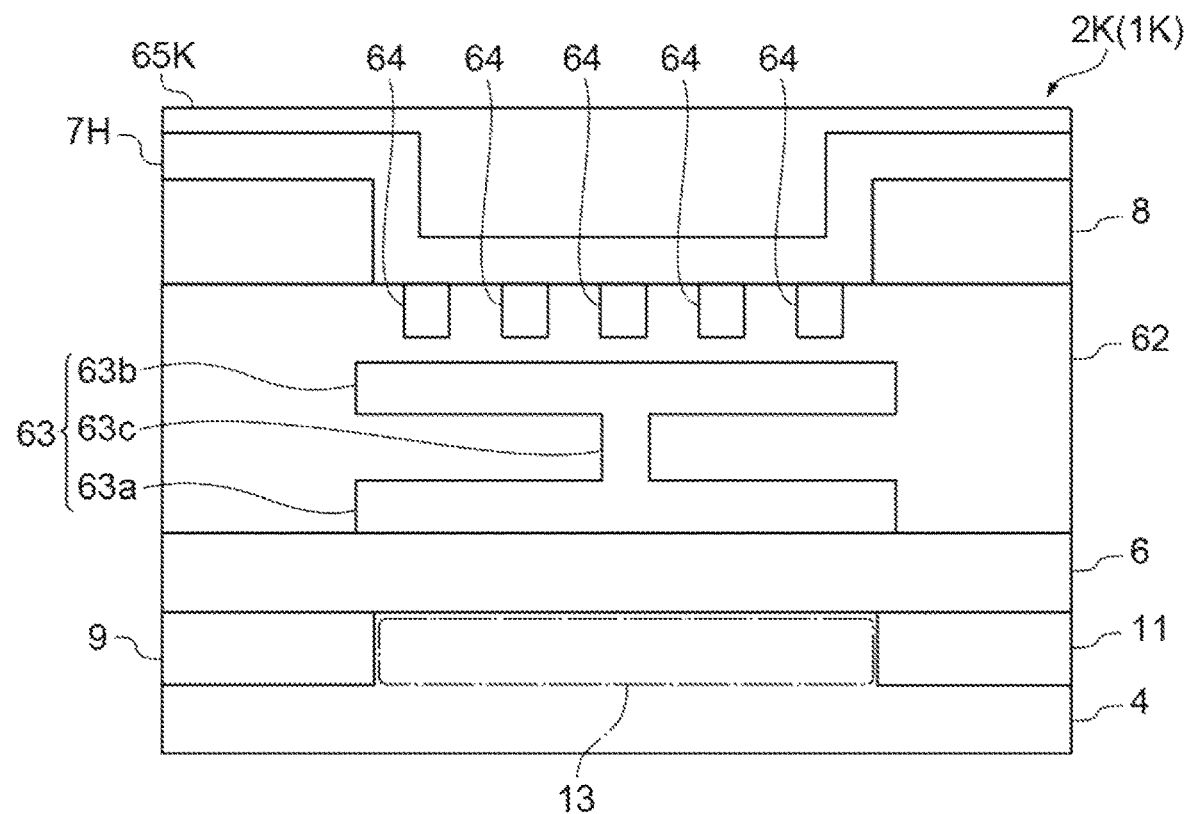
FIG. 19(a) is a diagram illustrating a measurement ISFET provided in a pH sensor of Modification Example 11.

As illustrated in FIG. 19(a), the pH sensor 1K of Modification Example 11 includes the measurement ISFET 2K and the power supply unit 3 (refer to FIG. 1 or the like). The pH sensor 1K of Modification Example 11 further includes the ion selective membrane 65K, in addition to the configuration of the pH sensor 1H of Modification Example 10.

The ion selective membrane 65K is provided on the main surface of the measurement ion sensitive membrane 7H. The measurement ion sensitive membrane 7H has different heights in a portion provided on the embedded membrane 62 and a portion provided on the protective membrane 8. That is, the measurement ion sensitive membrane 7H has a constant membrane thickness and includes a step corresponding to the height of the protective membrane 8. On the other hand, the ion selective membrane 65K does not have a step. The main surface of the ion selective membrane 65K is approximately flat. That is, a membrane thickness of the ion selective membrane 65K is not constant. In the ion selective membrane 65K, a membrane thickness in a region formed on the embedded membrane 62 is greater than a membrane thickness in a region formed on the protective membrane 8.

The pH sensor 1K of Modification Example 11 further includes the ion selective membrane 65K, in addition to the configuration of the pH sensor 1H of Modification Example 10. According to such a configuration, the type of ions to be a detection target can be changed after the measurement ISFET 2H illustrated in FIG. 18(b) is manufactured.

Modification Example 12

Figure 19B:
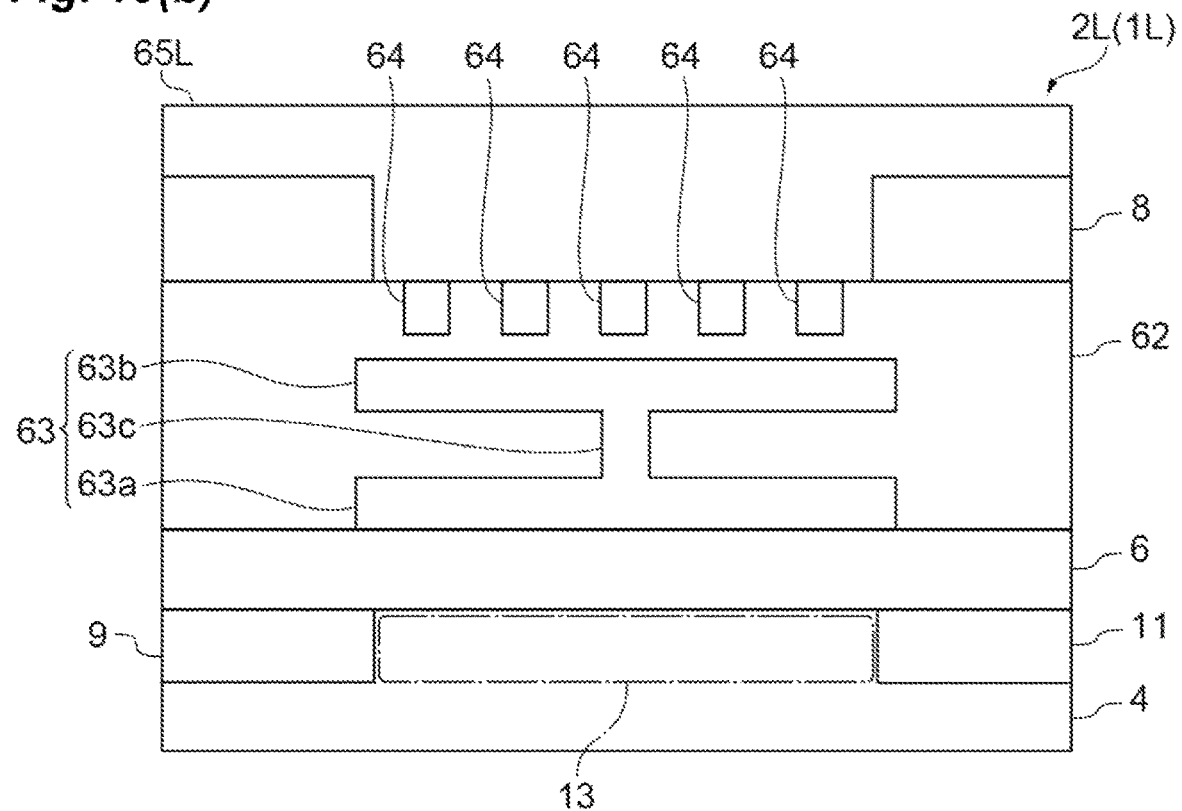
FIG. 19(b) is a diagram illustrating a measurement ISFET provided in a pH sensor of Modification Example 12.

As illustrated in FIG. 19(b), the pH sensor 1L of Modification Example 12 includes the measurement ISFET 2L and the power supply unit 3 (refer to FIG. 1 or the like). The pH sensor 1L of Modification Example 12 has a configuration in which the measurement ion sensitive membrane 7H is replaced with the ion selective membrane 65L, in the pH sensor 1H of Modification Example 10.

The ion selective membrane 65L is provided on the main surface of the embedded membrane 62 and the protective membrane 8. That is, the ion selective membrane 65L is in contact with the embedded membrane 62 and the protective membrane 8. More specifically, the ion selective membrane 65L is in contact with the electrode 64. The main surface of the ion selective membrane 65L does not include a step. That is, a membrane thickness of the ion selective membrane 65L is not constant. In the ion selective membrane 65L, a membrane thickness in a region in contact with the embedded membrane 62 is greater than a membrane thickness in a region in contact with the protective membrane 8.

The pH sensor 1L of Modification Example 12 includes the ion selective membrane 65L instead of the measurement ion sensitive membrane 7H of the pH sensor 1H of Modification Example 10. According to such a configuration, an electrical field due to the electrode 64 can be strongly transmitted to the ion selective membrane 65L.

REFERENCE SIGNS LIST 1, 1A, 1B, 1C, 1D: pH sensor (ion concentration measuring device), 2: measurement ion sensitive field effect transistor (ISFET, measurement sensor unit), 3: power supply unit, 4: substrate, 6: insulating membrane, 7: measurement ion sensitive membrane, 7C: correction ion sensitive membrane, 8: protective membrane, 8a: silicon oxide membrane, 8b: silicon nitride membrane, 9: source, 11: drain, 12: substrate power supply, 13: channel, 14: measurement target electrode, 16: measurement target power supply, 17: measurement membrane electrode, 17a: electrode ridge, 17C: correction membrane electrode, 18: measurement membrane power supply, 18C: correction membrane power supply, 19: power supply control unit, 30: data processing unit, 101: measurement target, 102: measurement ions, 103: non-measurement ions, 200: drain current, S1: sensitive region, S2: electrode region, R: resistance component.

The invention claimed is:

1. An ion concentration measuring device obtaining a concentration of measurement ions by being provided in a measurement target containing the measurement ions and non-measurement ions, the device comprising:
a measurement target power supply that controls a voltage of the measurement target;
a measurement sensor unit that includes an ion trapping membrane selectively trapping the measurement ions to generate a voltage corresponding to the number of trapped measurement ions;
a measurement membrane power supply that controls a voltage of the ion trapping membrane; and
a power supply control unit that controls a size of a voltage to be output from each of the measurement target power supply and the measurement membrane power supply,
wherein when polarity of the non-measurement ions is negative, the power supply control unit controls at least one of the measurement target power supply and the measurement membrane power supply such that the voltage of the measurement ion trapping membrane is smaller than the voltage of the measurement target.

2. The ion concentration measuring device according to any claim 1, further comprising:
a measurement membrane electrode that is connected to the measurement membrane power supply and is embedded in the measurement ion trapping membrane.

3. The ion concentration measuring device according to claim 2,
wherein the measurement sensor unit is an ion sensitive field effect transistor including a substrate, an insulating membrane provided on the substrate, and the ion trapping membrane provided on the insulating membrane,
the device further comprises a substrate power supply that controls a voltage of the substrate, and
the power supply control unit controls the substrate power supply.

4. The ion concentration measuring device according to claim 2,
wherein the measurement membrane electrode includes a plurality of electrode ridges.

5. The ion concentration measuring device according to claim 4,
wherein the measurement membrane electrode is a striped electrode.

6. The ion concentration measuring device according to claim 4,
wherein the measurement sensor unit is an ion sensitive field effect transistor including a substrate, an insulating membrane provided on the substrate, and the ion trapping membrane provided on the insulating membrane.

7. The ion concentration measuring device according to claim 6,
wherein the electrode ridges extend to a direction intersecting with a direction of a current flowing between a source and a drain that are formed in the substrate, and are separated from each other along the direction of the current.

8. An ion concentration measuring device obtaining a concentration of measurement ions by being provided in a measurement target containing the measurement ions and non-measurement ions, the device comprising:
a measurement target power supply that controls a voltage of the measurement target;
a measurement sensor unit that includes an ion trapping membrane selectively trapping the measurement ions to generate a voltage corresponding to the number of trapped measurement ions;
a measurement membrane power supply that controls a voltage of the ion trapping membrane; and
a power supply control unit that controls a size of a voltage to be output from each of the measurement target power supply and the measurement membrane power supply,
wherein when polarity of the non-measurement ions is positive, the power supply control unit controls at least one of the measurement target power supply and the measurement membrane power supply such that the voltage of the measurement ion trapping membrane is larger than the voltage of the measurement target.

9. The ion concentration measuring device according to claim 8, further comprising:
a measurement membrane electrode that is connected to the measurement membrane power supply and is embedded in the measurement ion trapping membrane.

10. The ion concentration measuring device according to claim 9,
wherein the measurement sensor unit is an ion sensitive field effect transistor including a substrate, an insulating membrane provided on the substrate, and the ion trapping membrane provided on the insulating membrane,
the device further comprises a substrate power supply that controls a voltage of the substrate, and
the power supply control unit controls the substrate power supply.

11. The ion concentration measuring device according to claim 9,
wherein the measurement membrane electrode includes a plurality of electrode ridges.

12. The ion concentration measuring device according to claim 11,
wherein the measurement membrane electrode is a striped electrode.

13. The ion concentration measuring device according to claim 11,
wherein the measurement sensor unit is an ion sensitive field effect transistor including a substrate, an insulating membrane provided on the substrate, and the ion trapping membrane provided on the insulating membrane.

14. The ion concentration measuring device according to claim 13,
wherein the electrode ridges extend to a direction intersecting with a direction of a current flowing between a source and a drain that are formed in the substrate, and are separated from each other along the direction of the current.

15. An ion concentration measuring device obtaining a concentration of measurement ions by being provided in a measurement target containing the measurement ions and non-measurement ions, the device comprising:
a measurement target power supply that controls a voltage of the measurement target;
a measurement sensor unit that includes an ion trapping membrane selectively trapping the measurement ions to generate a voltage corresponding to the number of trapped measurement ions;
a measurement membrane power supply that controls a voltage of the ion trapping membrane; and
a power supply control unit that controls a size of a voltage to be output from each of the measurement target power supply and the measurement membrane power supply,
wherein the power supply control unit repeatedly performs
a suppressing operation for suppressing infiltration of the non-measurement ions to the measurement ion trapping membrane by controlling at least one of the measurement target power supply and the measurement membrane power supply such that a difference between the voltage of the measurement target and the voltage of the measurement ion trapping membrane decreases, and
a measuring operation for obtaining a voltage corresponding to the number of measurement ions trapped by the measurement sensor unit by controlling at least one of the measurement target power supply and the measurement membrane power supply such that the voltage of the measurement target and the voltage of the measurement ion trapping membrane have potentials different from each other.

16. The ion concentration measuring device according to claim 15, further comprising:
a correction sensor unit that includes a correction ion trapping membrane selectively trapping the measurement ions to generate a voltage corresponding to the number of trapped measurement ions; and
a correction membrane power supply that controls a voltage of the correction ion trapping membrane,
wherein the power supply control unit repeatedly performs
a first suppressing operation for suppressing infiltration of the non-measurement ions to the measurement ion trapping membrane by controlling at least one of the measurement target power supply and the measurement membrane power supply such that a difference between the voltage of the measurement target and the voltage of the measurement ion trapping membrane decreases, and
a first measuring operation for obtaining a voltage corresponding to the number of measurement ions trapped by the measurement sensor unit by controlling at least one of the measurement target power supply and the measurement membrane power supply such that the voltage of the measurement target and the voltage of the measurement ion trapping membrane have potentials different from each other, and
a second suppressing operation for suppressing infiltration of the non-measurement ions to the correction ion trapping membrane by controlling at least one of the measurement target power supply and the correction membrane power supply such that a difference between the voltage of the measurement target and the voltage of the correction ion trapping membrane decreases, and
a second measuring operation for obtaining a voltage corresponding to the number of measurement ions trapped by the correction sensor unit by controlling at least one of the measurement target power supply and the correction membrane power supply such that the voltage of the measurement target and the voltage of the correction ion trapping membrane have potentials different from each other, and
the second measuring operation is performed every time when the first measuring operation is executed n times (n is an integer of greater than or equal to 2).

17. The ion concentration measuring device according to claim 15, further comprising:
a measurement membrane electrode that is connected to the measurement membrane power supply and is embedded in the measurement ion trapping membrane.

18. The ion concentration measuring device according to claim 17,
wherein the measurement sensor unit is an ion sensitive field effect transistor including a substrate, an insulating membrane provided on the substrate, and the ion trapping membrane provided on the insulating membrane,
the device further comprises a substrate power supply that controls a voltage of the substrate, and
the power supply control unit controls the substrate power supply.

19. The ion concentration measuring device according to claim 17,
wherein the measurement membrane electrode includes a plurality of electrode ridges.

20. The ion concentration measuring device according to claim 19,
wherein the measurement sensor unit is an ion sensitive field effect transistor including a substrate, an insulating membrane provided on the substrate, and the ion trapping membrane provided on the insulating membrane.

21. The ion concentration measuring device according to claim 20,
wherein the electrode ridges extend to a direction intersecting with a direction of a current flowing between a source and a drain that are formed in the substrate, and are separated from each other along the direction of the current.

\* \* \* \* \*